(12) United States Patent
Kuroda et al.

(10) Patent No.: US 11,994,775 B2
(45) Date of Patent: May 28, 2024

(54) LIQUID CRYSTAL DISPLAY DEVICE

(71) Applicant: JSR CORPORATION, Tokyo (JP)

(72) Inventors: Yoshihiko Kuroda, Tokyo (JP); Koichi Miyachi, Tokyo (JP)

(73) Assignee: JSR CORPORATION, Tokyo (JP)

( * ) Notice: Subject to any disclaimer, the term of this patent is extended or adjusted under 35 U.S.C. 154(b) by 160 days.

(21) Appl. No.: 17/628,210

(22) PCT Filed: Jul. 21, 2020

(86) PCT No.: PCT/JP2020/028305
§ 371 (c)(1),
(2) Date: Jan. 18, 2022

(87) PCT Pub. No.: WO2021/039219
PCT Pub. Date: Mar. 4, 2021

(65) Prior Publication Data
US 2022/0252943 A1 Aug. 11, 2022

(30) Foreign Application Priority Data
Aug. 23, 2019 (JP) ................................. 2019-153145

(51) Int. Cl.
*G02F 1/1337* (2006.01)
*G02F 1/1335* (2006.01)

(52) U.S. Cl.
CPC .. *G02F 1/133707* (2013.01); *G02F 1/133531* (2021.01); *G02F 1/133723* (2013.01); *G02F 1/133746* (2021.01)

(58) Field of Classification Search
CPC ......... G02F 1/133746; G02F 1/133707; G02F 1/133753; G02F 1/133773; G02F 1/133723
See application file for complete search history.

(56) References Cited

U.S. PATENT DOCUMENTS

2006/0209240 A1* 9/2006 Kataoka ............ G02F 1/133753
349/123
2014/0213137 A1* 7/2014 Miyake ............. G02F 1/133788
445/25
(Continued)

FOREIGN PATENT DOCUMENTS

JP    2010008693    1/2010
JP    5184618       4/2013
(Continued)

OTHER PUBLICATIONS

"International Search Report (Form PCT/ISA/210) of PCT/JP2020/028305," mailed on Oct. 13, 2020, with English translation thereof, pp. 1-4.
(Continued)

*Primary Examiner* — Jonathan Y Jung
(74) *Attorney, Agent, or Firm* — JCIPRNET

(57) ABSTRACT

In this liquid crystal display device, a plurality of pixels 30 are arranged in a display region. The liquid crystal display device comprises a first substrate 11 in which a pixel electrode 15 having slits 15a is provided, a second substrate disposed face to the first substrate 11, a liquid crystal layer 13 containing liquid crystal molecules that have negative dielectric anisotropy, a first alignment film 22, and a second alignment film 23. The slits 15a are positioned in each alignment region of a plurality of alignment regions in the pixels 30, and have oblique slit parts extending in an oblique direction with respect to sides of the pixels 30. The angle γ formed by the direction in which the oblique slit parts extends and a liquid crystal projection direction is 15 degrees or more and 85 degrees or less.

13 Claims, 21 Drawing Sheets

(56) References Cited

U.S. PATENT DOCUMENTS

| | | | | |
|---|---|---|---|---|
| 2015/0177571 A1* | 6/2015 | Yoshida | ................ | G02F 1/1336 |
| | | | | 349/138 |
| 2018/0284544 A1* | 10/2018 | Shimoshikiryoh | ......................... | |
| | | | | G02F 1/133788 |
| 2019/0219871 A1* | 7/2019 | Kawahira | ......... | G02F 1/133723 |

FOREIGN PATENT DOCUMENTS

| WO | 2017057209 | 4/2017 |
|----|------------|--------|
| WO | 2017057210 | 4/2017 |

OTHER PUBLICATIONS

Office Action of China Counterpart Application, with English translation thereof, issued on Sep. 1, 2023, pp. 1-22.

* cited by examiner

LIQUID CRYSTAL DISPLAY DEVICE

CROSS-REFERENCE TO RELATED APPLICATION

This application is a 371 of international application of PCT application serial no. PCT/JP2020/028305, filed on Jul. 21, 2020, which claims the priority benefit of Japan application no. 2019-153145 filed on Aug. 23, 2019. The entirety of each of the above-mentioned patent applications is hereby incorporated by reference herein and made a part of this specification.

TECHNICAL FIELD

The present disclosure relates to a liquid crystal display device.

BACKGROUND ART

For liquid crystal displays, specifically liquid crystal display panels for large-sized televisions, a viewing angle, a transmittance, a response time and the like are important performance indicators. As liquid crystal display modes for improving values of these performance indicators, various modes such as a 4Domain-Reverse Twisted Nematic (4D-RTN) mode, a Polymer Sustained Alignment (PSA) mode, an In Plane Switching (IPS) mode, and a Fringe Field Switching (FFS) mode have been developed (for example, refer to Patent Literature 1). Currently, large-sized televisions using these liquid crystal display mode technologies are mass-produced.

In recent years, 4K (3840×2160 pixels) and 8K (7680×4320 pixels) televisions with higher definition than previous high-definition televisions (1920×1080 pixels) have been realized. However, in 4K or 8K liquid crystal display panels, the panel transmittance tends to decrease due to an increase in the number of wirings and switching elements and the like. When the panel transmittance decreases, the light utilization efficiency of the backlight decreases, which leads to an increase in power consumption.

In order to address such problems, Patent Literature 2 discloses a technology utilizing a 4Domain-Electrically Controlled Birefringence (4D-ECB) mode in order to improve the transmittance of 4D-RTN using a photo-alignment film. In the liquid crystal display device described in Patent Literature 2, four alignment regions in which tilt orientations of liquid crystal molecules are different from each other are arranged in one pixel in a longitudinal direction of pixels, and when a liquid crystal display panel is viewed in a plan view, the twist angle of liquid crystal molecules is set to be substantially 0 degrees in each of these four alignment regions.

CITATION LIST

Patent Literature

[Patent Literature 1]
Japanese Patent No. 5184618
[Patent Literature 2]
WO 2017/057210

SUMMARY OF INVENTION

Technical Problem

Although the technology described in Patent Literature 2 was expected to be able to improve the transmittance of the liquid crystal display device, the liquid crystal display device described in Patent Literature 2 cannot be said to be excellent in viewing angle characteristics. In order to obtain a liquid crystal display device with higher quality than ever before, it is required to have both transmittance characteristics and viewing angle characteristics.

The present disclosure has been made in view of the above circumstances, and one objective of the present disclosure is to provide a liquid crystal display device having excellent transmittance characteristics and viewing angle characteristics.

Solution to Problem

The inventors conducted extensive studies in order to address the above problem, and solved the problem of the present disclosure by focusing on the relationship between a direction in which a slit extends in a pixel electrode and an alignment orientation of liquid crystal molecules. Specifically, the present disclosure provides the following aspects.
[1] A liquid crystal display device in which a plurality of pixels are arranged in a display region, including:
  a first substrate, on which a pixel electrode having a slit is provided;
  a second substrate, arranged to face the first substrate;
  a liquid crystal layer, disposed between the first substrate and the second substrate and contains liquid crystal molecules having negative dielectric anisotropy;
  a first alignment film, formed on the first substrate; and
  a second alignment film, formed on the second substrate,
  wherein at least one of the first alignment film and the second alignment film is a photo-alignment film,
  wherein each pixel in the plurality of pixels has a plurality of alignment regions in which alignment orientations of liquid crystal molecules are different from each other when a voltage is applied,
  wherein the slit is arranged in each alignment region in the plurality of alignment regions and has an oblique slit part formed to extend in an oblique direction with respect to each side of the pixel, and
  wherein an angle formed by a direction in which the oblique slit part extends and a liquid crystal projection direction is 15 degrees or more and 85 degrees or less, wherein the liquid crystal projection direction is a direction in which a longitudinal direction of liquid crystal molecules present in the vicinity of the center of the liquid crystal layer in a thickness direction when no voltage is applied is projected onto the first substrate.
[2] The liquid crystal display device according to [1], wherein an angle formed by a predetermined side among the sides and the liquid crystal projection direction is 0 degrees or more and 30 degrees or less.
[3] The liquid crystal display device according to [2], wherein an angle formed by the predetermined side and a direction in which the oblique slit part extends is 45 degrees or more and 85 degrees or less.
[4] A liquid crystal display device in which a plurality of pixels are arranged in a display region, including: a first substrate on which a pixel electrode having a slit is provided; a second substrate that is arranged to face the first substrate; a liquid crystal layer which is disposed between the first substrate and the second substrate and contains liquid crystal molecules having negative dielectric anisotropy; a first alignment film formed on the first substrate; a second alignment film formed on the second substrate; a first polarizing plate disposed on an opposite side to the liquid crystal layer with the first substrate therebetween; and a second polarizing plate disposed on an opposite side to the liquid crystal layer with the second substrate therebetween. At least one of the first alignment film and the second alignment film is a photo-alignment film, each pixel in the plurality of pixels has a plurality of alignment regions in which alignment orientations of liquid crystal molecules are different from each other when a voltage is applied, the slit is arranged in each alignment region in the plurality of alignment regions and has an oblique slit part formed to extend in an oblique direction with respect to each side of the pixel, in a plan view, a transmission axis of the first polarizing plate and a transmission axis of the second polarizing plate are orthogonal to each other, when an axial direction of the transmission axis of the first polarizing plate is defined as 0 degrees and an axial direction of the transmission axis of the second polarizing plate is defined as 90 degrees, a liquid crystal projection direction is 0 degrees or more and 30 degrees or less in each of the plurality of alignment regions, wherein the liquid crystal projection direction is a direction in which a longitudinal direction of liquid crystal molecules present in the vicinity of the center of the liquid crystal layer in a thickness direction when no voltage is applied is projected onto the first substrate, and the direction in which the oblique slit part extends is 45 degrees or more and 85 degrees or less in each of the plurality of alignment regions.

Advantageous Effects of Invention

According to the present disclosure, it is possible to obtain a liquid crystal display device having excellent transmittance characteristics and viewing angle characteristics.

DESCRIPTION OF EMBODIMENTS

First Embodiment

Figure 1:
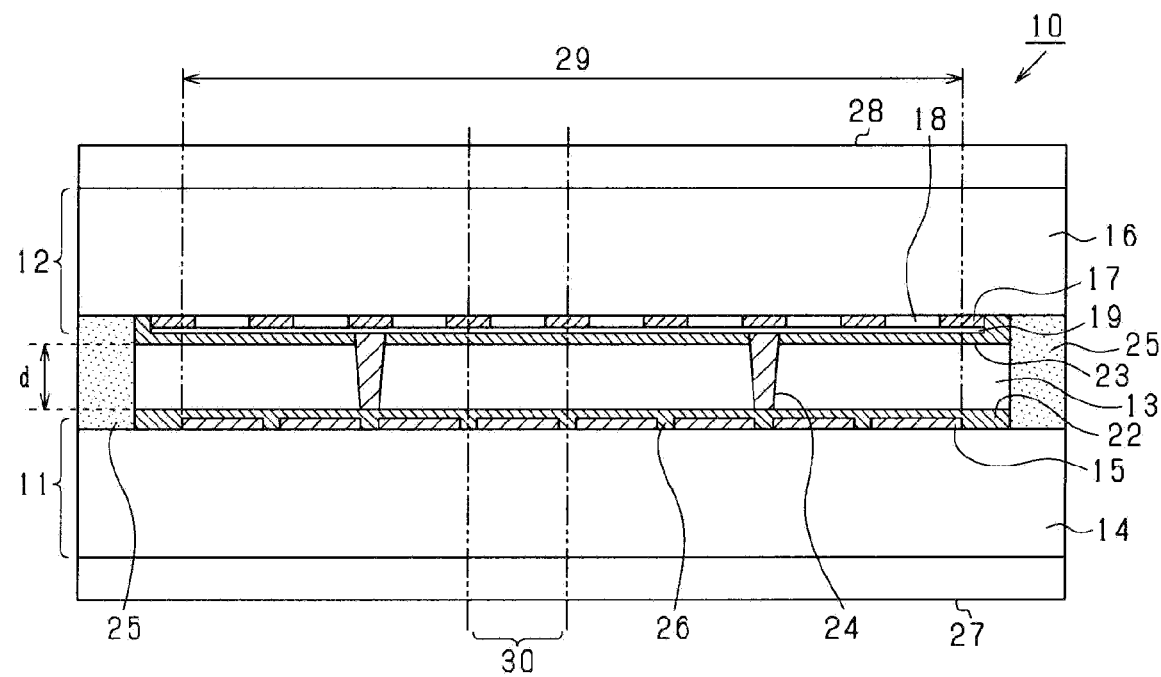
FIG. 1 is a schematic view showing a schematic configuration of a liquid crystal display device.

A first embodiment will be described below with reference to the drawings. Hereinafter, in the following respective embodiments, the same or equivalent components will be denoted with the same reference numerals in the drawings and the same descriptions will apply to components with the same reference numerals. Here, in the following description, for convenience, the vertical and horizontal directions are defined based on the direction in which the display region of the liquid crystal display device is viewed from the front.

In this specification, a "pixel" is the minimum unit for expressing a shade (gradation) of each color in a display, and corresponds to, for example, a unit for expressing respective gradations of R, G, and B in a color display device. Therefore, the expression "pixel" refers to R pixels, G pixels, and B pixels individually rather than color display pixels (pixel elements) in which an R pixel, a G pixel, and a B pixel are combined. That is, in the case of a color display device, one pixel corresponds to any color of a color filter. The "pretilt angle" is an angle formed by a surface of an alignment film and a liquid crystal molecule in the vicinity of the alignment film in a longitudinal direction when no voltage is applied to a liquid crystal display device (voltage off state).

The "orientation" is a direction in a substrate plane or a plane parallel to a substrate plane. However, for the orientation, the tilt angle of the substrate plane with respect to a normal direction is not taken into consideration. When there is no particular description of a reference, for the orientation, a direction which is parallel to the lower side of a pixel when viewed from the front of the display region and extends to the right is defined as a reference direction (0 degrees), and counterclockwise is represented as a positive angle. The "alignment orientation of the liquid crystal layer" is a direction with a longitudinal end on the side of the substrate on which a pixel electrode is arranged (first substrate) as a start point, and a longitudinal end on the side of the other substrate (second substrate) as an end point in liquid crystal molecules present in the vicinity of the center of the liquid crystal layer in the thickness direction (more specifically, liquid crystal molecules present in the vicinity of the center in the layer surface in the liquid crystal layer of each pixel and present in the vicinity of the center of the liquid crystal layer in the thickness direction). Therefore, the "orientation in which the longitudinal direction of liquid crystal molecules present in the vicinity of the center of the liquid crystal layer in the thickness direction is projected on the first substrate" is an orientation in which a direction with a longitudinal end on the side of the first substrate in liquid crystal molecules present in the vicinity of the center of the liquid crystal layer in the thickness direction as a start point and a longitudinal end on the side of the second substrate as an end point is projected onto the first substrate. The "tilt orientation" is a direction with a longitudinal end on the side of an alignment film of liquid crystal molecules present in the vicinity of the alignment film in a voltage off state as a start point and a longitudinal end on the side opposite to the alignment film as an end point.

<Liquid Crystal Display Device>

A liquid crystal display device 10 is a thin film transistor (TFT) type liquid crystal display device, and a plurality of pixels 30 are arranged side by side in a display region 29. As shown in FIG. 1, the liquid crystal display device 10 includes a pair of substrates: a first substrate 11 and a second substrate 12, and a liquid crystal layer 13 arranged between the first substrate 11 and the second substrate 12. Here, in the present embodiment, application to the TFT type liquid crystal display device has been described, but the present disclosure may be applied to another drive method (for example, a passive matrix method or a plasma address method).

The first substrate 11 is a TFT substrate in which, on a surface of a transparent substrate 14 made of glass, a resin or the like on the side of the liquid crystal layer 13, a pixel electrode 15 made of a transparent conductor such as indium tin oxide (ITO), a TFT as a switching element, and various wirings such as a scanning line and a signal line are arranged. The pixel electrode 15 is an electrode in which a slit is provided (a slit electrode). The second substrate 12 is a CF substrate in which, on a surface of a transparent substrate 16 made of glass, a resin or the like on the side of the liquid crystal layer 13, a black matrix 17, a color filter 18, and a counter electrode 19 made of a transparent conductor (also called a common electrode) are provided. The counter electrode 19 is a planar electrode in which no slit is formed.

On the pair of substrates 11 and 12, a liquid crystal alignment film in which liquid crystal molecules in the vicinity of the substrate plane are aligned in a predetermined orientation with respect to the substrate plane (that is, a surface on which the electrode is arranged) is formed. The liquid crystal alignment film is a vertical alignment film in which, when the voltage is turned off, liquid crystal molecules are aligned so that a longitudinal direction of the liquid crystal molecules is perpendicular to the substrate plane. The liquid crystal display device 10 includes, as liquid crystal alignment films, a first alignment film 22 formed on the surface of the first substrate 11 on which the electrode is arranged and a second alignment film 23 formed on the surface of the second substrate 12 on which the electrode is arranged.

The first substrate 11 and the second substrate 12 are arranged with a spacer 24 therebetween with a predetermined gap (cell gap) so that the surface of the first substrate 11 on which the electrode is arranged and the surface of the second substrate 12 on which the electrode is arranged face each other. Here, while FIG. 1 shows a case in which the spacer 24 is a columnar spacer, it may be another spacer for a liquid crystal device such as a bead spacer. The pair of substrates 11 and 12 arranged to face each other are bonded together at their peripheral parts via a sealing material 25. A space surrounded by the first substrate 11, the second substrate 12 and the sealing material 25 is filled with a liquid crystal composition. Therefore, the liquid crystal layer 13 is formed between the first substrate 11 and the second substrate 12. The liquid crystal layer 13 is filled with liquid crystal molecules having negative dielectric anisotropy. The thickness (d) of the liquid crystal layer 13 is, for example, 1.5 to 8.0 μm, and preferably 2.0 μm or more.

A polarizing plate is arranged outside the first substrate 11 and the second substrate 12. The liquid crystal display device 10 includes, as polarizing plates, a first polarizing plate 27 provided on the side of the first substrate 11 and a second polarizing plate 28 provided on the side of the second substrate 12. A transmission axis 27a of the first polarizing plate 27 and a transmission axis 28a of the second polarizing plate 28 are arranged so that they are orthogonal to each other when viewed from the front of the display region 29. In addition, a terminal region is provided on the outer edge part of the first substrate 11. The liquid crystal display device 10 is driven by connecting a driver IC for driving a liquid crystal or the like to this terminal region.

(Alignment Orientation of Each Pixel)

Figure 2:
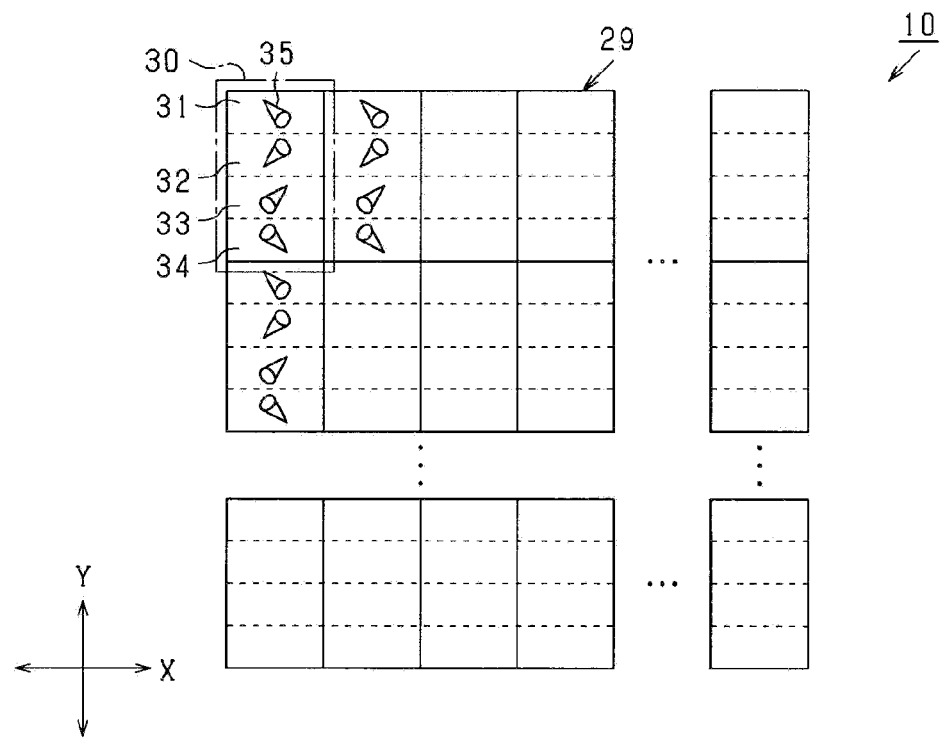
FIG. 2 is a schematic view showing a pixel arrangement.

FIG. 2 is a schematic view showing an arrangement of the pixels 30 when the display region 29 of the liquid crystal display device 10 is viewed from the side of the second substrate 12. In the drawing, the cone with the numerical value 35 represents a liquid crystal molecule. In the liquid crystal molecule 35, the apex side of the cone represents the side of the first substrate 11, and the bottom side of the cone represents the side of the second substrate 12. For convenience, FIG. 2 shows liquid crystal molecules 35 for some pixels.

Figure 3:
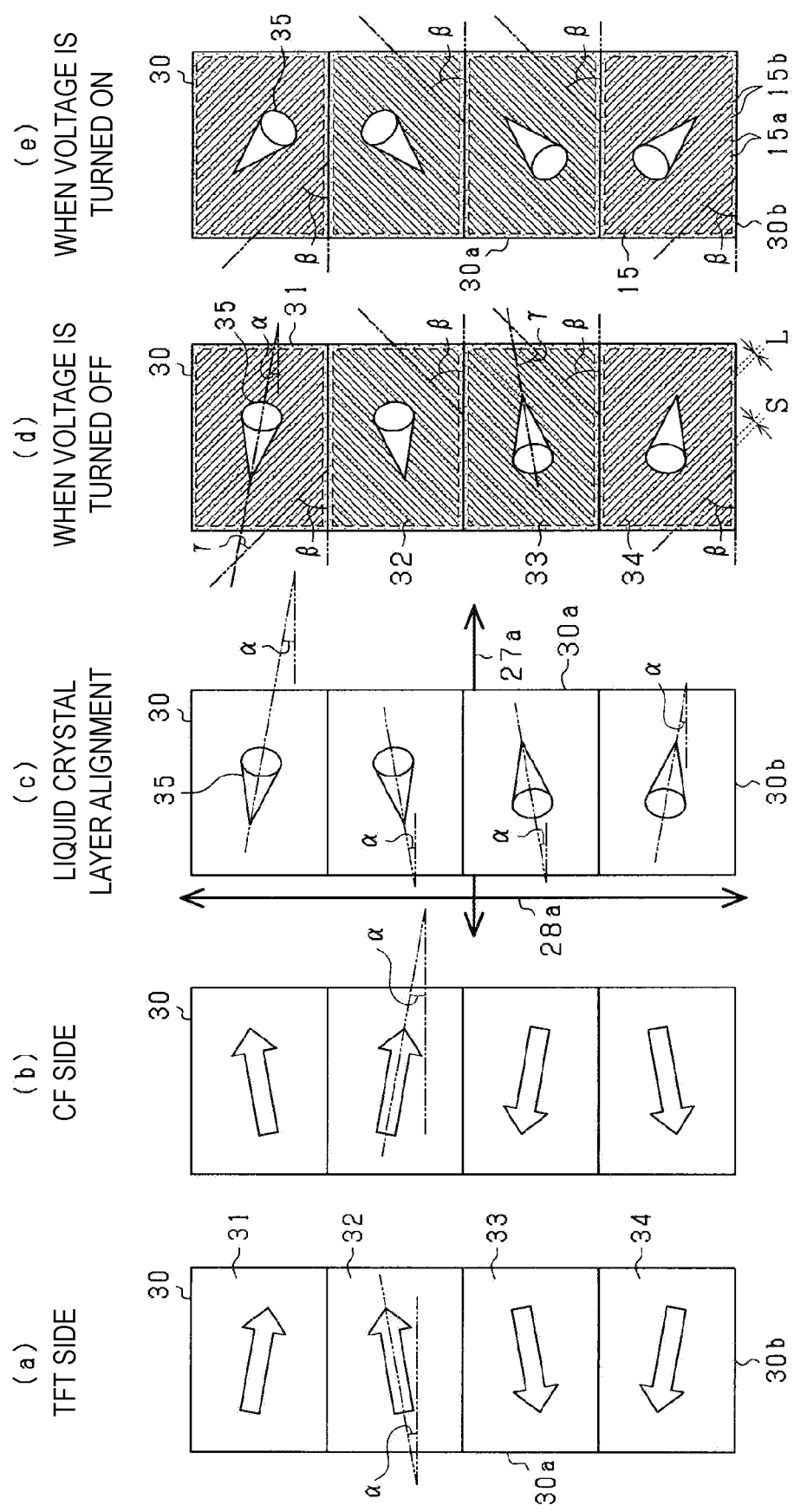
FIG. 3 shows schematic views of tilt orientations and alignment orientations of a liquid crystal display device according to a first embodiment.

The pixel 30 has a rectangular shape, and includes a long-side part 30a extending in a vertical direction and a short-side part 30b extending in a left to right direction (refer to (a) of FIG. 3). As shown in FIG. 2, in the display region 29, a plurality of pixels 30 are arranged in a matrix form in the vertical direction (the Y-axis direction in FIG. 2) and the left to right direction (the X-axis direction in FIG. 2). In the present embodiment, the transverse direction of the pixels 30 and the X-axis direction are parallel, and the longitudinal direction of the pixels 30 and the Y-axis direction are parallel. In addition, the X-axis direction is a direction parallel to the axial direction of the first transmission axis 27a, and the Y-axis direction is a direction parallel to the axial direction of the second transmission axis 28a.

Each pixel 30 has a plurality of regions in which alignment orientations of the liquid crystal layer 13 when the voltage is turned on are different from each other. Therefore, viewing angle characteristics of the liquid crystal display device 10 are compensated for. In the present embodiment, in each pixel 30, four alignment regions in which alignment orientations of the liquid crystal layer 13 when the voltage is turned on are different from each other are formed.

Specifically, each pixel 30 includes, as a plurality of alignment regions, a first domain 31, a second domain 32, a third domain 33 and a fourth domain 34. These four domains 31 to 34 are arranged side by side in one pixel in the vertical direction (that is, a direction parallel to the axial direction of the second transmission axis 28a). In the first to fourth domains 31 to 34, the alignment orientation of the liquid crystal layer 13 when the voltage is turned off is one of α degrees, 180−α degrees, 180+α degrees, and −α degrees (where 0≤α≤30 degrees is satisfied). In other words, when the axial direction of the first transmission axis 27a is defined as 0 degrees and the axial direction of the second transmission axis 28a is defined as 90 degrees, the alignment orientation of the liquid crystal layer 13 when the voltage is turned off is within a range of 0 degrees or more and 30 degrees or less in each of the first to fourth domains 31 to 34. Here, the orientation when the axial direction of the first transmission axis 27a is defined as 0 degrees and the axial direction of the second transmission axis 28a is defined as 90 degrees is represented as an angle of 0 degrees or more and 90 degrees or less. In the following, when the axial direction of the first transmission axis 27a is defined as 0 degrees and the axial direction of the second transmission axis 28a is defined as 90 degrees, an angle formed by the transverse direction (X-axis direction) of the pixels 30 and the alignment orientation of the liquid crystal layer 13 when the voltage is turned off is referred to as a "liquid crystal projection angle α." The liquid crystal projection angle α is the smaller angle between angles formed by the transverse direction of the pixels 30 and the alignment orientation of the liquid crystal layer 13 when the voltage is turned off.

A case in which α=10 degrees will be described with reference to FIG. 3. In FIG. 3, (a) shows a tilt orientation of liquid crystal molecules in the vicinity of the first substrate 11, (b) shows a tilt orientation of liquid crystal molecules in the vicinity of the second substrate 12, (c) and (d) show alignment orientations of the liquid crystal layer 13 when the voltage is turned off, and (e) shows an alignment orientation of the liquid crystal layer 13 when the voltage is turned on. Here, in (a) of FIG. 3 and (b) of FIG. 3, white arrows indicate tilt orientations. (a) of FIG. 3 and (b) of FIG. 3 are schematic views when the liquid crystal alignment film formed on the substrate is viewed from the side of the liquid crystal layer 13. (c) to (e) of FIG. 3 are schematic views of the liquid crystal display device 10 in a plan view from the side of the second substrate 12. (d) of FIG. 3 and (e) of FIG. 3 also show the pixel electrode 15 provided on the first substrate 11.

In the example of FIG. 3, when the first substrate 11 is viewed from the side of the liquid crystal layer 13, the tilt orientation of liquid crystal molecules in the vicinity of the first substrate 11 is −10 degrees (=350 degrees) in the first domain 31, 10 degrees in the second domain 32, 190 degrees in the third domain 33, and 170 degrees in the fourth domain 34 (refer to (a) of FIG. 3). In addition, when the second substrate 12 is viewed from the side of the liquid crystal layer 13, the tilt orientation of liquid crystal molecules in the vicinity of the second substrate 12 is 10 degrees in the first domain 31, −10 degrees (=350 degrees) in the second domain 32, 170 degrees in the third domain 33, and 190 degrees in the fourth domain 34 (refer to (b) of FIG. 3). When the liquid crystal display device 10 is constructed so that surfaces of alignment films of the pair of substrates 11 and 12 face each other, in the liquid crystal display device 10, the alignment orientation of the liquid crystal layer 13 when the voltage is turned off is −10 degrees (=350 degrees) in the first domain 31, 10 degrees in the second domain 32, 190 degrees in the third domain 33, and 170 degrees in the fourth domain 34 (refer to (c) and (d) of FIG. 3).

(Liquid Crystal Alignment Film)

At least one of the first alignment film 22 and the second alignment film 23 is a photo-alignment film, and in the present embodiment, both the first alignment film 22 and the second alignment film 23 are photo-alignment films. The first alignment film 22 and the second alignment film 23 are formed by emitting polarized light obliquely to a coating film formed using a polymer composition containing a polymer having a photoalignable group (hereinafter referred to as a "liquid crystal alignment agent") using a photomask (for example, a polarizer) a plurality of times. Therefore, a plurality of regions in which, when the voltage is turned on, alignment orientations of the liquid crystal layer 13 are different from each other are formed in one pixel.

Here, in this specification, the "photo-alignment film" is a liquid crystal alignment film formed by emitting polarized or unpolarized light to a coating film formed using a polymer having a photoalignable group. The "photoalignable group" is a functional group that imparts anisotropy to a film by a photoisomerization reaction, a photodimerization reaction, a photodegradation reaction, a photorearrangement reaction or the like due to light emission.

The polymer component of the liquid crystal alignment agent is not particularly limited, but is preferably at least one polymer selected from the group consisting of polymers obtained using polyamic acid, polyamic acid ester, polyimide, polyorganosiloxane, and monomers having unsaturated bonds (hereinafter also referred to as "unsaturated monomeric polymers"). Examples of unsaturated monomeric polymers include a maleimide-based polymer and a (meth)acrylic polymer. Here, the maleimide-based polymer is a polymer having a structural unit derived from a maleimide compound. The maleimide-based polymer is preferably a polymer having a structural unit derived from a maleimide compound and a structural unit derived from a styrene compound (a styrene-maleimide-based polymer).

Examples of photoalignable groups include an azobenzene-containing group containing azobenzene or derivatives thereof as a basic framework, a cinnamic acid structure-containing group containing cinnamic acid or derivatives thereof (cinnamic acid structure) as a basic framework, a chalcone-containing group containing chalcone or derivatives thereof as a basic framework, a benzophenone-containing group containing benzophenone or derivatives thereof as a basic framework, a phenyl benzoate-containing group containing phenyl benzoate or derivatives thereof as a basic framework, and a coumarin-containing group containing coumarin or derivatives thereof as a basic framework. Among these, in consideration of high photoreactivity, the liquid crystal alignment agent used when the first alignment film 22 and the second alignment film 23 are formed preferably contains a polymer having a cinnamic acid structure-containing group.

In order to minimize a response delay of the liquid crystal molecule 35, at least one of the pretilt angle defined by the first alignment film 22 and the pretilt angle defined by the second alignment film 23 is preferably less than 90 degrees. In the present embodiment, both the pretilt angle defined by the first alignment film 22 and the pretilt angle defined by the second alignment film 23 are less than 90 degrees. The pretilt angle is preferably 89.9 degrees or less, more preferably 89.5 degrees or less, and still more preferably 89.0 degrees or less. In addition, in order to minimize a decrease in contrast of the liquid crystal display device 10, the pretilt angle is preferably 81.0 degrees or more, more preferably 83.0 degrees or more, and still more preferably 84.0 degrees or more.

(Slit)

In the pixel electrode 15, a plurality of slits 15a which are openings are provided (refer to (d) and (e) of FIG. 3). The slit 15a is an oblique slit extending in an oblique direction with respect to sides (the long-side part 30a and the short-side part 30b) of the pixel 30. The slit 15a is formed on the entire surface of the pixel region. Therefore, in each of the domains 31 to 34, a plurality of linear electrodes 15b extending in parallel in a direction in which the slit 15a extends are arranged on the entire surface. The width of the slit 15a (hereinafter referred to as a "slit width") is, for example, 1 to 8 μm, and preferably 5 μm or less. In addition, the distance between the slits 15a adjacent to each other (that is, the width of the linear electrode 15b; hereinafter also referred to as an "electrode width") is, for example, 1 to 8 μm, and preferably 5 μm or less. Here, as shown in FIG. 3, the slit 15a included in the pixel electrode 15 may be composed of only an oblique slit, or may further include an opening parallel to the long-side part 30a or the short-side part 30b.

The orientation in which the slit 15a extends (that is, the orientation in which the linear electrode 15b extends) is β degrees or −β degrees (where 45 degrees≤β≤85 degrees is satisfied) in each of the first to fourth domains 31 to 34. In other words, when the axial direction of the first transmission axis 27a is defined as 0 degrees and the axial direction of the second transmission axis 28a is defined as 90 degrees, an angle formed by the orientation in which the slit 15a extends and the transverse direction (X-axis direction) of the pixels 30 is 45 degrees or more and 85 degrees or less in each of the first to fourth domains 31 to 34. The orientation in which the slit 15a extends is different between the first domain 31 and the second domain 32, and different between the third domain 33 and the fourth domain 34. Specifically, in the first domain 31 and the fourth domain 34, the orientation in which the slit 15a extends is −β degrees (=360−β degrees), and in the second domain 32 and the third domain 33, the orientation in which the slit 15a extends is β degrees.

Here, in the following, the angle formed by the transverse direction (X-axis direction) of the pixels 30 and the direction in which the slit 15a extends is referred to as a "slit angle β." The slit angle β is the smaller angle between two angles (refer to (d) and (e) of FIG. 3). The slit angle β is an angle formed by the first transmission axis 27a and the direction in which the slit 15a extends, and can have a value of 0 degrees or more and 90 degrees or less.

When the voltage is turned on, a plurality of alignment regions have different alignment orientations of the liquid crystal layer 13 from one another due to an application of an electric field formed by the slit 15a. In this case, the alignment orientation of the liquid crystal layer 13 is parallel to the direction in which the slit 15a extends in each alignment region (refer to (e) of FIG. 3). For example, in the liquid crystal display device 10 in FIG. 3, β=45 degrees, and the alignment orientation of the liquid crystal layer 13 in each domain is −10 degrees (=350 degrees), 10 degrees, 190 degrees, and 170 degrees when the voltage is turned off (refer to (d) of FIG. 3), and −45 degrees (=315 degrees), 45 degrees, 225 degrees, and 135 degrees when the voltage is turned on (refer to (e) of FIG. 3).

In the liquid crystal display device 10, in each of the domains 31 to 34 of each pixel 30, the angle γ (the smaller angle between two angles, refer to (d) of FIG. 3) formed by the direction in which the slit 15a extends and the alignment orientation of the liquid crystal layer 13 when the voltage is turned off is within a range of 15 degrees or more and 85 degrees or less. When the angle γ is within the above range, it is possible to obtain the liquid crystal display device 10 having excellent transmittance characteristics and viewing angle characteristics. In order to further improve transmittance characteristics and viewing angle characteristics of the liquid crystal display device 10 when the voltage is turned on, the angle γ is more preferably 20 degrees or more, still more preferably 30 degrees or more, and particularly preferably 35 degrees or more. In addition, the angle γ is more preferably 80 degrees or less, still more preferably 70 degrees or less, and particularly preferably 65 degrees or less. Here, the angle γ is represented by the difference between the slit angle β and the liquid crystal projection angle α. In the example of FIG. 3, the angle γ is 35 degrees.

Figure 4:
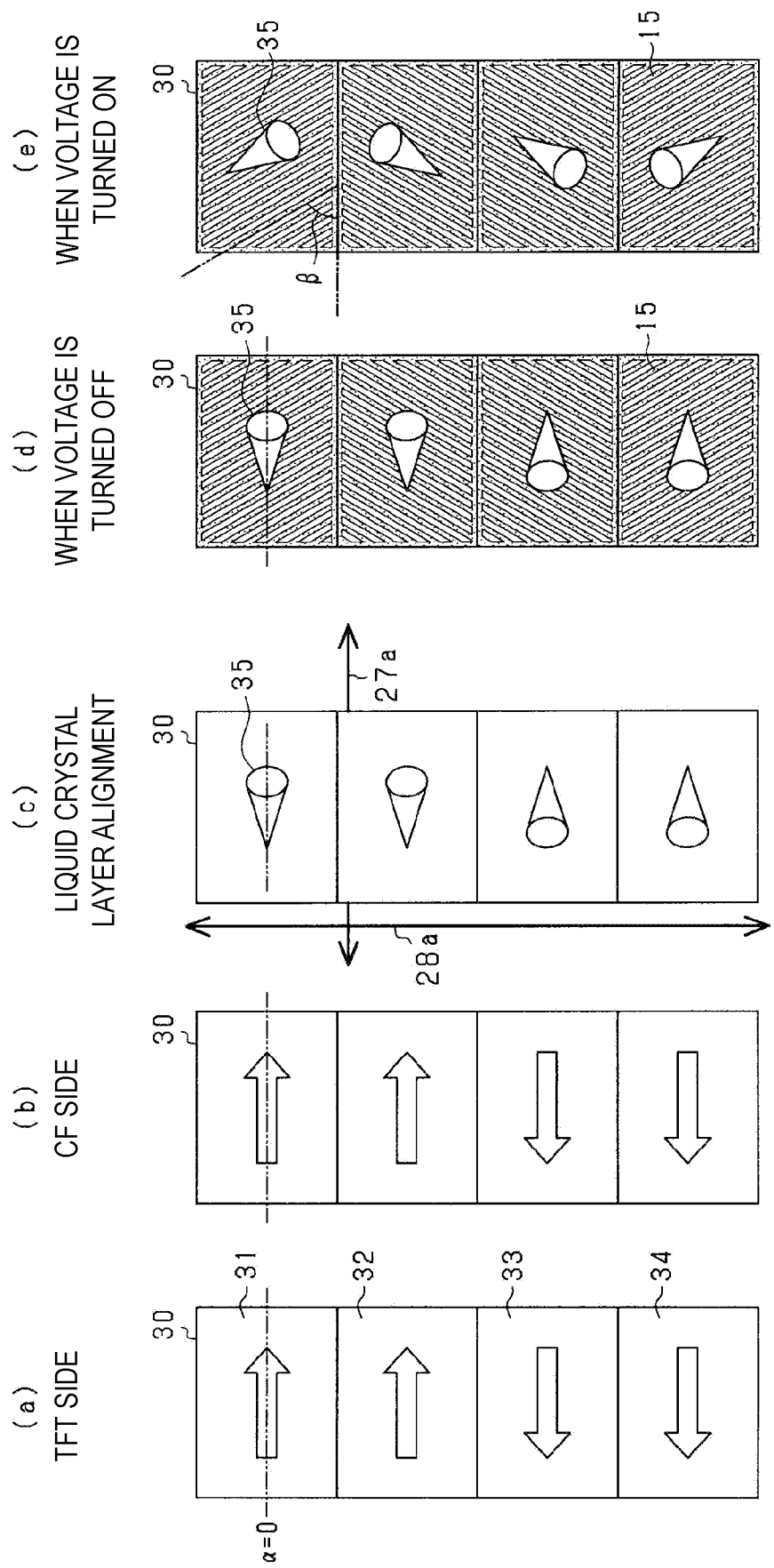
FIG. 4 shows schematic views of tilt orientations and alignment orientations of pixels of the liquid crystal display device according to the first embodiment.

Next, as another example of the liquid crystal display device 10 according to the present embodiment, a case in which α=0 degrees and β=60 degrees will be described with reference to FIG. 4. (a) to (e) of FIG. 4 are the same as those of FIG. 3. In the example of FIG. 4, when the first substrate 11 is viewed from the side of the liquid crystal layer 13, the tilt orientation of liquid crystal molecules in the vicinity of the first substrate 11 is 0 degrees in the first domain 31 and the second domain 32, and 180 degrees in the third domain 33 and the fourth domain 34 (refer to (a) of FIG. 4). In addition, when the second substrate 12 is viewed from the side of the liquid crystal layer 13, the tilt orientation of liquid crystal molecules in the vicinity of the second substrate 12 is 0 degrees in the first domain 31 and the second domain 32, and 180 degrees in the third domain 33 and the fourth domain 34 (refer to (b) of FIG. 4). In the liquid crystal display device 10, the alignment orientation of the liquid crystal layer 13 when the voltage is turned off is 0 degrees in the first domain 31 and the second domain 32, and 180 degrees in the third domain 33 and the fourth domain 34. In addition, the alignment orientation of the liquid crystal layer 13 when the voltage is turned on is parallel to the direction in which the slit 15a extends, that is, −60 degrees (=300 degrees) in the first domain 31, 60 degrees in the second domain 32, 240 degrees in the third domain 33, and 120 degrees in the fourth domain 34. The angle γ is 60 degrees.

In order to further enhance an effect of improving viewing angle characteristics, the liquid crystal projection angle α is preferably 0 degrees or more and 25 degrees or less, more preferably 0 degrees or more and 20 degrees or less, still more preferably 0 degrees or more and 15 degrees or less, and particularly preferably 0 degrees or more and 10 degrees or less. The slit angle β is preferably an angle larger than 45 degrees, more preferably 50 degrees or more, and still more preferably 55 degrees or more because a drive voltage of the liquid crystal display device can be lowered. In addition, the slit angle β is preferably 80 degrees or less, more preferably 75 degrees or less, still more preferably 70 degrees or less, and particularly preferably 60 degrees or less because an effect of improving transmittance characteristics when the voltage is turned on can be further enhanced.

<Method of Producing Liquid Crystal Display Device>

Next, a method of producing a liquid crystal display device 10 will be described. The liquid crystal display device 10 can be produced by a method including the following processes 1 to 3.

(Process 1: Formation of Coating Film)

First, according to a known method, the first substrate 11 and the second substrate 12 before an alignment film is formed are prepared. Subsequently, a liquid crystal alignment agent is applied to surfaces of the first substrate 11 and the second substrate 12 on which each electrode is arranged, and a coating film is formed on the substrate. The liquid crystal alignment agent is preferably applied to the substrate by an offset printing method, a flexographic printing method, a spin coating method, a roll coater method or an inkjet printing method. After the liquid crystal alignment agent is applied, in order to prevent dripping of the applied liquid crystal alignment agent, preliminary heating (pre-caking) is preferably performed. The pre-caking temperature is preferably 30 to 200° C., and the pre-caking time is preferably 0.25 to 10 minutes. Then, firing (post-baking) is performed. The post-baking temperature is preferably 80 to 300° C., and the post-baking time is preferably 5 to 200 minutes. The thickness of the formed liquid crystal alignment film is preferably 0.001 to 1 μm.

(Process 2: Alignment Treatment)

Subsequently, in order to impart desired pretilt angle characteristics to the liquid crystal alignment film, a photo-alignment treatment was performed on at least one of the coating films (liquid crystal alignment films) formed in the process 1. In the present embodiment, for each of the coating film formed on the first substrate 11 and the coating film formed on the second substrate 12, using a photomask, according to the tilt orientation expressed in the liquid crystal alignment film, polarized light (linearly polarized light) is emitted to the substrate plane in the oblique direction. Therefore, a pretilt angle imparting ability is exhibited in the coating film to form a liquid crystal alignment film. The photo-alignment treatment is performed according to a plurality of scanning processes in which the exposure orientations on the coating film are different from each other. According to these plurality of scanning processes, a plurality of domains (in FIG. 3 and FIG. 4, four domains) in which the alignment orientations of the liquid crystal layer 13 when the voltage is turned on are different from each other are formed in one pixel.

As light emitted to a coating film, for example, ultraviolet rays and visible light including light with a wavelength of 150 to 800 nm can be used. Ultraviolet rays including light with a wavelength of 200 to 400 nm are preferable. Examples of a light source used include a low pressure mercury lamp, a high pressure mercury lamp, a deuterium lamp, a metal halide lamp, an argon resonance lamp, a xenon lamp, and an excimer laser. A radiation amount of light emitted is preferably 100 to 50,000 J/m$^2$, and more preferably 150 to 20,000 J/m$^2$.

As shown in FIG. 3, when the liquid crystal projection angle α was made larger than 0, scan exposure was performed on each substrate a number of times that corresponded to the number of alignment regions formed in one pixel (in the present embodiment, a total of four times). On the other hand, as shown in FIG. 4, when the liquid crystal projection angle α is 0, scan exposure is performed on each substrate only a number of times that corresponds to half of the number of alignment regions formed in one pixel (in the present embodiment, a total of two times). Therefore, when α=0, the number of times that the alignment treatment is performed when the liquid crystal display device 10 is produced can be reduced and the efficiency of the production process can be improved.

(Process 3: Construction of Liquid Crystal Cell)

Subsequently, using two substrates on which the liquid crystal alignment film is formed (the first substrate 11 and the second substrate 12), a liquid crystal cell is produced by arranging liquid crystal molecules having negative dielectric anisotropy between the two substrates arranged to face each other. In order to produce a liquid crystal cell, for example, a method in which two substrates are arranged to face each other with a gap so that the liquid crystal alignment films face each other, peripheral parts of the two substrates are bonded together with a sealing material, a liquid crystal is injected and filled into the cell gap surrounded by the surface of the substrate and the sealing material and an injection hole is sealed, a method using an ODF scheme, and the like may be used. In the PSA mode, after the liquid crystal cell is constructed, when a voltage is applied between conductive films of the pair of substrates, light is emitted to the liquid crystal cell.

Subsequently, the first polarizing plate 27 and the second polarizing plate 28 are bonded to the outer surfaces of the liquid crystal cell so that the transmission axis 27a and the transmission axis 28a are orthogonal to each other, and thus the liquid crystal display device 10 is obtained. Examples of polarizing plates include a polarizing plate in which a polarizing film called "H film" in which iodine is absorbed while a polyvinyl alcohol is stretch-aligned is interposed between cellulose acetate protective films and a polarizing plate composed of the H film itself.

<Operation of Liquid Crystal Display Device>

Next, an operation of the above liquid crystal display device 10 will be described. In the liquid crystal display device 10, the angle γ formed by the direction in which the slit 15a extends and the alignment orientation of the liquid crystal layer 13 when the voltage is turned off is within a range of 15 degrees or more and 85 degrees or less. When the angle γ is within the above specific range, the transmittance characteristics and the viewing angle characteristics of the liquid crystal display device can be made excellent. This point will be further described using voltage-transmittance characteristics in FIG. 5 and FIG. 6. These voltage-transmittance characteristics are the results calculated by simulation under computation conditions that will be described in the following example.

Figure 5:
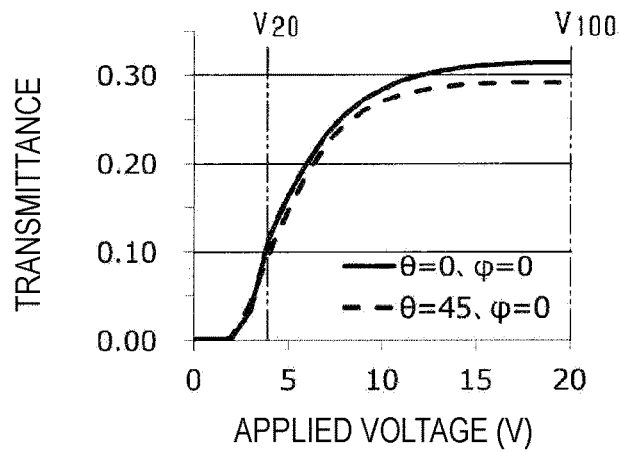
FIG. 5 is a diagram showing voltage-transmittance characteristics of the liquid crystal display device in FIG. 3.
Figure 6:
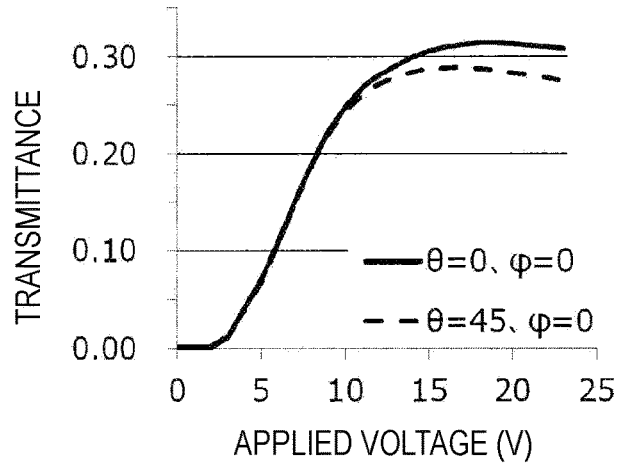
FIG. 6 is a diagram showing voltage-transmittance characteristics of the liquid crystal display device in FIG. 4.
Figure 7:
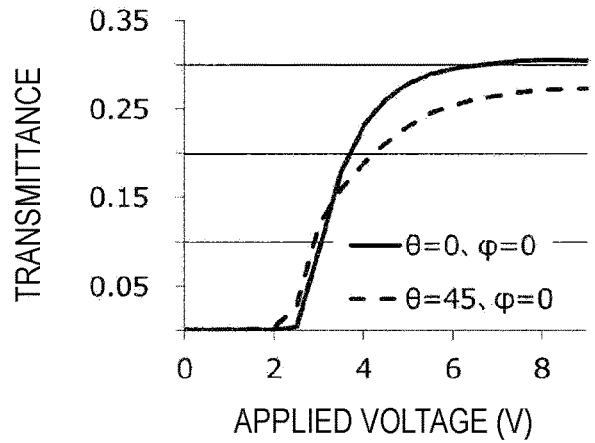
FIG. 7 is a diagram showing voltage-transmittance characteristics of the liquid crystal display device in FIG. 8.

FIG. 5 shows voltage-transmittance characteristics when the pretilt angle is 89 degrees in the liquid crystal display device 10 in FIG. 3. FIG. 6 shows voltage-transmittance characteristics when the pretilt angle is 87 degrees in the liquid crystal display device 10 in FIG. 4. FIG. 7 shows an example of a conventional UV2A mode type liquid crystal display device (γ=0 degrees) shown in FIG. 8 for comparison. In FIGS. 5 to 7, the solid line indicates a case in which the display region of the liquid crystal display device is viewed from the front (θ=0 degrees, φ=0 degrees), and the dashed line indicates a case in which the display region of the liquid crystal display device is viewed from the front in a direction tilted 45 degrees to the right or the left (θ=45 degrees, φ=0 degrees). θ is a polar angle when the front of the display region of the liquid crystal display device is defined as 0 degrees, and φ is an azimuth angle when the right direction when the display region is viewed from the front, which is a direction parallel to the transverse direction of the pixels, is defined as 0 degrees.

As shown in FIG. 5, in the liquid crystal display device 10 in FIG. 3, at both θ=0 degrees and θ=45 degrees, the maximum transmittance is sufficiently high and the transmittance characteristics are good. In addition, in the liquid crystal display device 10 in FIG. 3, even if the applied voltage (drive voltage) is high, the transmittance difference between θ=0 degrees and θ=45 degrees is small, and the viewing angle characteristics are also good. Furthermore, for the liquid crystal display device 10 in FIG. 4, the same results are obtained. On the other hand, in the liquid crystal display device in FIG. 8, when the applied voltage is high, the transmittance difference between θ=0 degrees and θ=45 degrees is large, and the viewing angle characteristics are inferior compared to the liquid crystal display device that satisfies the condition in which the angle γ is within a range of 15 degrees or more and 85 degrees or less.

The liquid crystal display device 10 can be effectively applied to various applications. The liquid crystal display device 10 can be used as various display devices, for example, for clocks, handheld game consoles, word processors, laptop computers, car navigation systems, camcorders, PDAs, digital cameras, mobile phones, smartphones, various monitors, liquid crystal televisions, and information displays.

Second Embodiment

Next, a second embodiment will be described focusing on the differences from the first embodiment. In the first embodiment, the pretilt angle defined by the first alignment film 22 and the pretilt angle defined by the second alignment film 23 are both less than 90 degrees. However, the present embodiment differs from the first embodiment in that one of the pretilt angle defined by the first alignment film 22 and the pretilt angle defined by the second alignment film 23 is less than 90 degrees, and the other is substantially 90 degrees.

Figure 9:
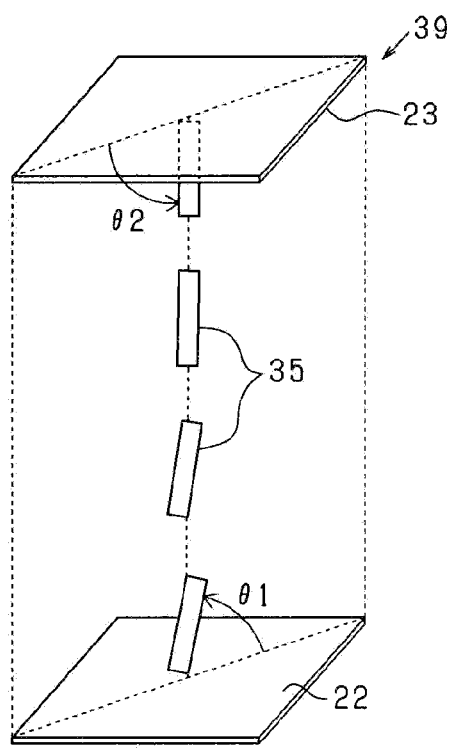
FIG. 9 is a schematic view showing pretilt angles of liquid crystal molecules in one alignment region.

FIG. 9 shows the pretilt angles of liquid crystal molecules in each pixel 30 in the liquid crystal display device according to the present embodiment. As shown in FIG. 9, in each alignment region 39 of the first to fourth domains 31 to 34, the pretilt angle θ1 defined by the first alignment film 22 is less than 90 degrees, and the pretilt angle θ2 defined by the second alignment film 23 is substantially 90 degrees.

Figure 10:
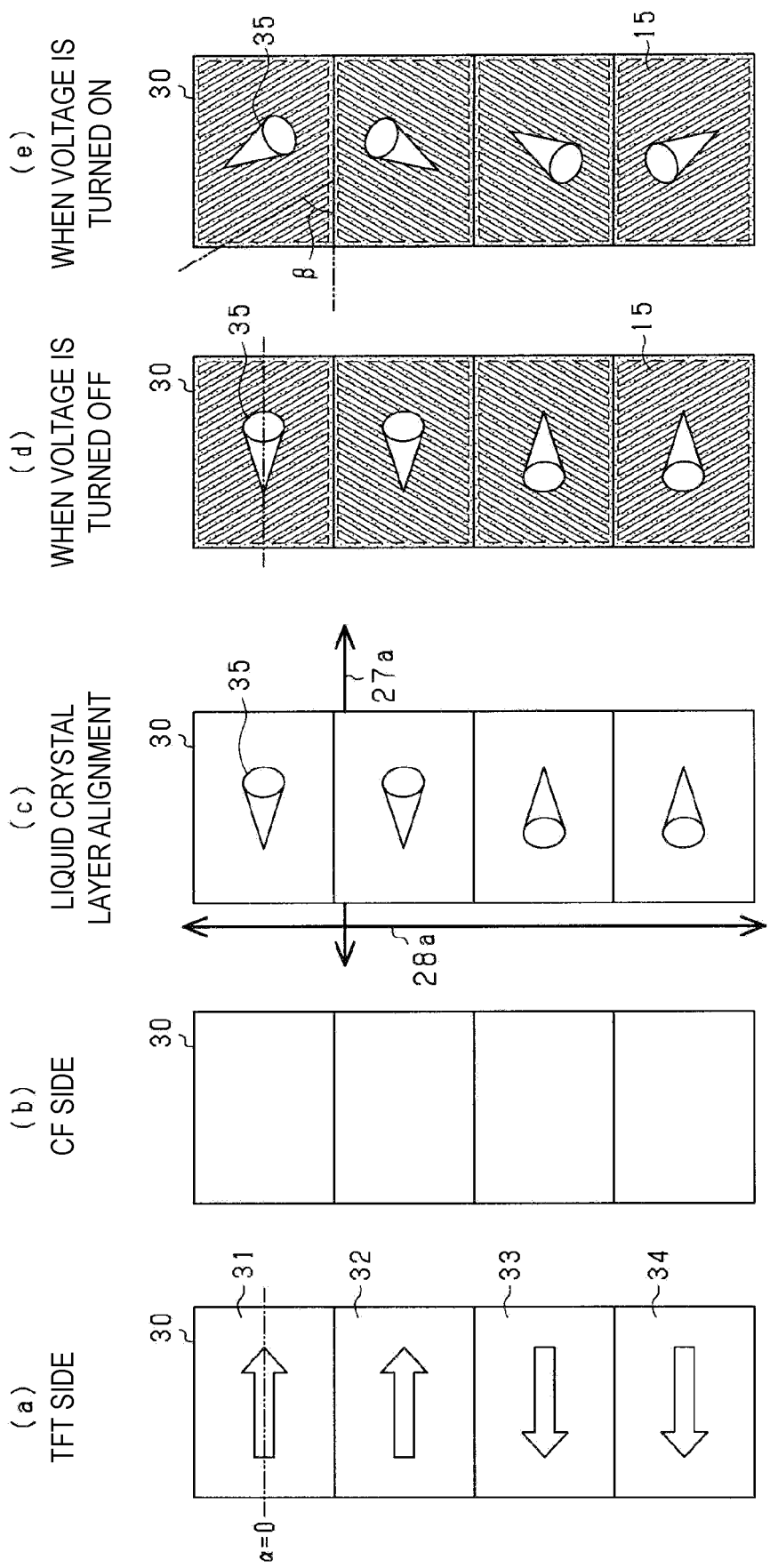
FIG. 10 shows schematic views of tilt orientations and alignment orientations of pixels of a liquid crystal display device according to a second embodiment.

Specifically, the first alignment film 22 is subjected to divided exposure according to a photo-alignment treatment so that the alignment orientation of liquid crystal molecules is different for each region in one pixel (refer to (a) of FIG. 10). The first alignment film 22 is formed by emitting polarized light obliquely to a coating film formed using a polymer having a photoalignable group using a photomask (for example, a polarizer) a plurality of times. On the other hand, the second alignment film 23 is not subjected to divided exposure (refer to (b) of FIG. 10), and when the voltage is turned off, the alignment orientation of the liquid crystal molecule 35 present in the vicinity of the second alignment film 23 is controlled in the same direction. In the present embodiment, the coating film formed using the same polymer composition as the first alignment film 22 is used as the second alignment film 23 without being radiated with light.

Here, in place of the configuration in which no light is emitted to the second alignment film 23, the entire surface of the second alignment film 23 may be subjected to unpolarized exposure in the normal direction of the substrate without using a photomask. In this case, the second substrate 12 may be exposed to parallel light or diffused light.

In order to minimize a response delay of the liquid crystal molecule 35, the pretilt angle θ1 defined by the first alignment film 22 is preferably 89.0 degrees or less, more preferably 88.5 degrees or less, and still more preferably 88.0 degrees or less. In addition, in order to minimize a decrease in contrast of the liquid crystal display device 10, the pretilt angle θ1 is preferably 81.0 degrees or more, more preferably 83.0 degrees or more, and still more preferably 84.0 degrees or more. Here, in this specification, "substantially 90 degrees" indicates a range of 90 degrees ±0.5 degrees. The pretilt angle θ2 defined by the second alignment film 23 is preferably 90 degrees ±0.2 degrees, and more preferably 90 degrees ±0.1 degrees.

Here, when the pretilt angle defined by the liquid crystal alignment film is asymmetric between the side of the first alignment film 22 and the side of the second alignment film 23, the heating temperature when the liquid crystal alignment film is formed may be made different between the first alignment film 22 and the second alignment film 23, the post-baking time when the liquid crystal alignment film is formed may be made different between the first alignment film 22 and the second alignment film 23, the film thickness of the liquid crystal alignment film may be made different between the first alignment film 22 and the second alignment film 23, or heterogeneous alignment films may be used as the first alignment film 22 and the second alignment film 23, and thus the occurrence of flickering and burning may be restricted.

FIG. 10 shows a case in which α=0 degrees and β=60 degrees as an example of the liquid crystal display device according to the present embodiment. (a) to (e) of FIG. 10 are the same as those of FIG. 3. In the example in FIG. 10, the first alignment film 22 is formed by divided exposure. According to divided exposure, when the first substrate 11 is viewed from the side of the liquid crystal layer 13, the tilt orientation of liquid crystal molecules in the vicinity of the first substrate 11 is 0 degrees in the first domain 31 and the second domain 32 and 180 degrees in the third domain 33 and the fourth domain 34. On the other hand, no exposure treatment is performed on the second alignment film 23. When the pair of substrates 11 and 12 are bonded together to construct the liquid crystal display device 10, in the liquid crystal display device 10, the alignment orientation of the liquid crystal layer 13 when the voltage is turned off is 0 degrees in the first domain 31 and the second domain 32, and 180 degrees in the third domain 33 and the fourth domain 34. In addition, when the voltage of the liquid crystal display device 10 is turned on, the alignment orientation of the liquid crystal layer 13 is the orientation parallel to the direction in which the slit 15a extends. Specifically, −60 degrees (=300 degrees) in the first domain 31, 60 degrees in the second domain 32, 240 degrees in the third domain 33, and 120 degrees in the fourth domain 34. The angle γ is 60 degrees.

Figure 11:
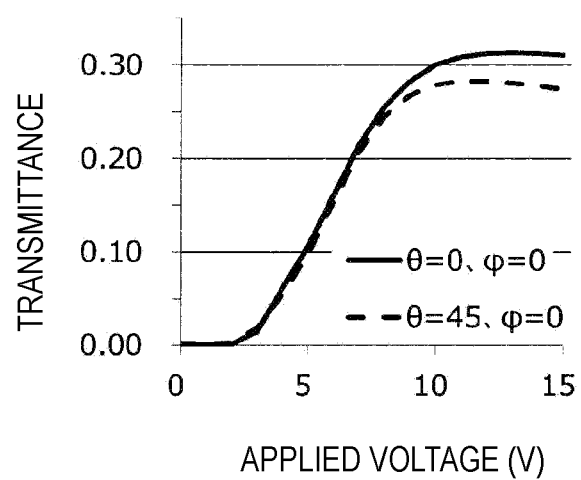
FIG. 11 is a diagram showing voltage-transmittance characteristics of the liquid crystal display device in FIG. 10.

FIG. 11 shows the relationship between the applied voltage and the transmittance of the liquid crystal display device in FIG. 10. Here, FIG. 11 shows a case in which the pretilt angle on the side of the first substrate 11 is 87.0 degrees, and the pretilt angle on the side of the second 12 substrate is 90 degrees and shows the results calculated by simulation under computation conditions that will be described in the following example. In FIG. 11, the solid line and the dashed line indicate the same things as in FIGS. 5 to 7. As shown in FIG. 11, in the liquid crystal display device in FIG. 10, in the front view (θ=0 degrees) and the oblique view (θ=45 degrees), the maximum transmittance is sufficiently high and the transmittance characteristics are good. In addition, in the liquid crystal display device in FIG. 10, even if the applied voltage is high, the transmittance difference between the front view (θ=0 degrees) and the oblique view (θ=45 degrees) is small, and the viewing angle characteristics are good.

Third Embodiment

Next, a third embodiment will be described focusing on the differences from the first embodiment and the second embodiment. The liquid crystal display device according to the present embodiment is the same as that of the second embodiment in that one of the pretilt angle defined by the first alignment film 22 and the pretilt angle defined by the second alignment film 23 is less than 90 degrees, and the other is substantially 90 degrees. However, the present embodiment differs from the second embodiment in that both the first alignment film 22 and the second alignment film 23 are produced by divided exposure.

Figure 12:
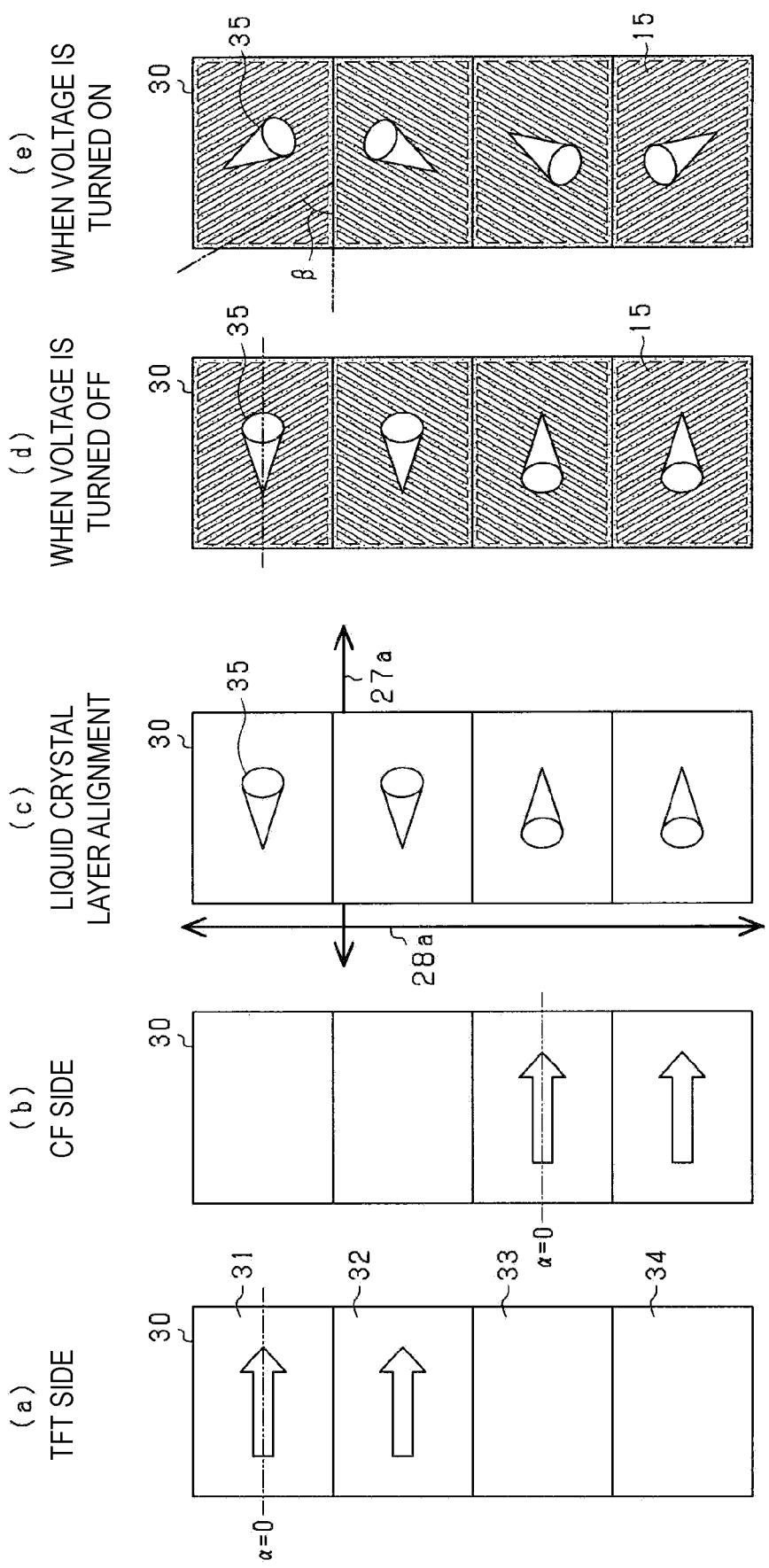
FIG. 12 shows schematic views of tilt orientations and alignment orientations of pixels of a liquid crystal display device according to a third embodiment.

FIG. 12 shows a case in which α=0 degrees and β=60 degrees as an example of the liquid crystal display device according to the present embodiment. (a) to (e) of FIG. 12 are the same as those of FIG. 3. In the example of FIG. 12, the first alignment film 22 is formed by performing divided exposure on the first domain 31 and the second domain 32. Therefore, when the first substrate 11 is viewed from the side of the liquid crystal layer 13, the tilt orientation of liquid crystal molecules in the vicinity of the first substrate 11 is 0 degrees in the first domain 31 and the second domain 32. Here, no light is emitted to the third domain 33 and the fourth domain 34 of the first alignment film 22 or unpolarized exposure is performed in the normal direction of the substrate. On the other hand, in the second alignment film 23, no light is emitted to the first domain 31 and the second domain 32 or unpolarized exposure is performed in the normal direction of the substrate, and divided exposure is performed on the third domain 33 and the fourth domain 34. Therefore, when the second substrate 12 is viewed from the side of the liquid crystal layer 13, the tilt orientation of liquid crystal molecules in the vicinity of the second substrate 12 is 0 degrees in the third domain 33 and the fourth domain 34.

When the pair of substrates 11 and 12 are bonded together to construct the liquid crystal display device, the alignment orientation of the liquid crystal layer 13 when the voltage of the liquid crystal display device is turned off is 0 degrees in the first domain 31 and the second domain 32, and 180 degrees in the third domain 33 and the fourth domain 34. In addition, when the voltage of the liquid crystal display device 10 is turned on, the alignment orientation of the liquid crystal layer 13 is −60 degrees (=300 degrees) in the first domain 31, 60 degrees in the second domain 32, 240 degrees in the third domain 33, and 120 degrees in the fourth domain 34. The angle γ is 60 degrees.

In the present embodiment, light is emitted to some of the first to fourth domains 31 to 34 to form the first alignment film 22 and the second alignment film 23. According to such an alignment treatment, in some (in the present embodiment, the first domain 31 and the second domain 32) of a plurality of domains in one pixel, the pretilt angle θ1 defined by the first alignment film 22 is less than 90 degrees and the pretilt angle θ2 defined by the second alignment film 23 is substantially 90 degrees. In the remaining domains (in the present embodiment, the third domain 33 and the fourth domain 34), the pretilt angle θ1 defined by the first alignment film 22 is substantially 90 degrees and the pretilt angle θ2 defined by the second alignment film 23 is less than 90 degrees.

The pretilt angle defined by the liquid crystal alignment film subjected to alignment exposure (hereinafter referred to as a "pretilt angle θ3") is smaller than the pretilt angle defined by the liquid crystal alignment film not subjected to alignment exposure (hereinafter referred to as a "pretilt angle θ4"). In order to minimize a response delay of the liquid crystal molecule 35, the pretilt angle θ3 is preferably 89.0 degrees or less, more preferably 88.5 degrees or less, and still more preferably 88.0 degrees or less. In addition, in order to minimize a decrease in contrast of the liquid crystal display device, the pretilt angle θ3 is preferably 81.0 degrees or more, more preferably 83.0 degrees or more, and still more preferably 84.0 degrees or more. The pretilt angle θ4 is substantially 90 degrees.

In this liquid crystal display mode, the number of scan exposures of a pair of substrates can be made equal to or less than the number of alignment regions formed in one pixel (a total of two times in the liquid crystal display device in FIG. 12). Therefore, the number of exposures can be reduced as much as possible, and the throughput can be improved.

In addition, in the liquid crystal display device according to the present embodiment, in some alignment regions among a plurality of alignment regions in one pixel, alignment exposure is performed on the first alignment film 22, and in the remaining alignment regions, alignment exposure is performed on the second alignment film 23. That is, each pixel 30 has a region in which directions of asymmetry in one pixel are opposite to each other. In this case, flickering will occur in the alignment region exposed to the side of the first substrate 11 and the alignment region exposed to the side of the second substrate 12 with waveforms having phases opposite to each other. Therefore, the display quality can be improved while reducing the number of exposures.

Fourth Embodiment

Next, a fourth embodiment will be described focusing on the differences from the first to third embodiments. In the first to third embodiments, a plurality of alignment regions (the first to fourth domains 31 to 34) are arranged side by side in the vertical direction of the pixels 30. On the other hand, the present embodiment differs from the first to third embodiments in that a plurality of alignment regions are arranged side by side in each of the vertical direction and the left to right direction of the pixels 30.

Figure 13:
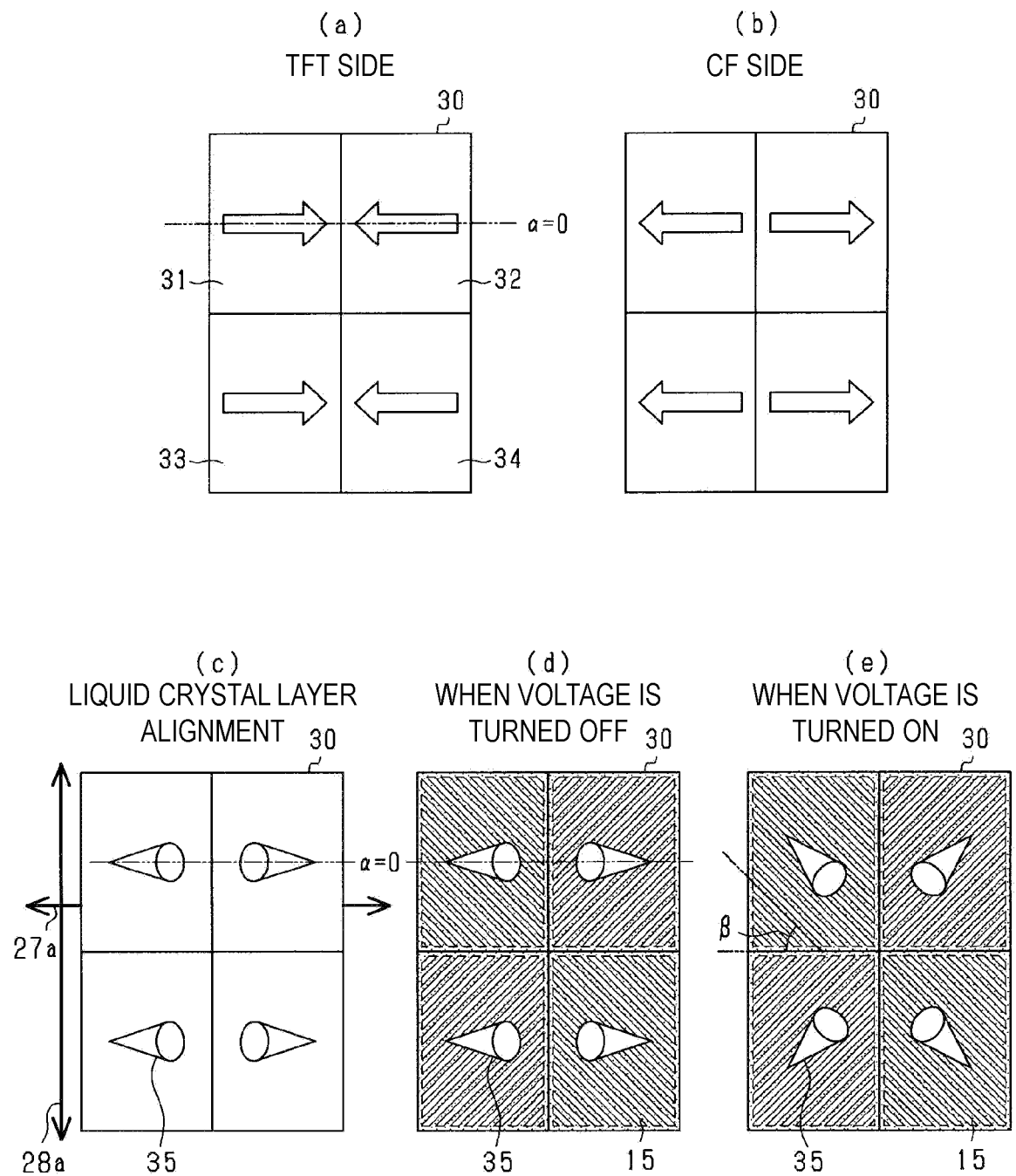
FIG. 13 shows schematic views of tilt orientations and alignment orientations of pixels of a liquid crystal display device according to a fourth embodiment.

As an example of the liquid crystal display device according to the present embodiment, a case in which α=0 degrees and β=45 degrees will be described with reference to FIG. 13. (a) to (e) of FIG. 13 are the same as those in FIG. 3. As shown in FIG. 13, two each of the first to fourth domains 31 to 34 are arranged side by side in each of the vertical direction and the left to right direction of the pixels 30 in one pixel. The directions in which the slit 15a extends are different between adjacent domains. Specifically, the slit 15a radially extends from the center of the pixels 30 toward the outer periphery when the pixel 30 is viewed in a plan view (refer to (e) of FIG. 13).

In the example of FIG. 13, when the first substrate 11 is viewed from the side of the liquid crystal layer 13, the tilt orientation of the liquid crystal molecule 35 in the vicinity of the first substrate 11 is 0 degrees in the first domain 31 and the third domain 33, and 180 degrees in the second domain 32 and the fourth domain 34. In addition, when the second substrate 12 is viewed from the side of the liquid crystal layer 13, the tilt orientation of liquid crystal molecules in the vicinity of the second substrate 12 is 180 degrees in the first domain 31 and the third domain 33, and 0 degrees in the second domain 32 and the fourth domain 34. When the voltage is turned off, the alignment orientation of the liquid crystal layer 13 is 0 degrees in the first domain 31 and the third domain 33, and 180 degrees in the second domain 32 and the fourth domain 34 (refer to (c) and (d) of FIG. 13), and when the voltage is turned on, the direction is parallel to the direction in which the slit 15a extends (refer to FIG. (e) of 13). The angle γ is 45 degrees.

Figure 14:
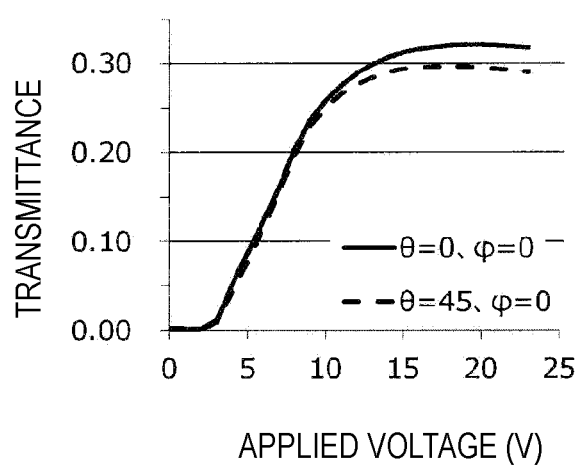
FIG. 14 is a diagram showing voltage-transmittance characteristics of the liquid crystal display device in FIG. 13.

FIG. 14 shows the relationship between the applied voltage and the transmittance of the liquid crystal display device in FIG. 13. Here, FIG. 14 shows a case in which the pretilt angle on the side of the first substrate 11 and the pretilt angle on the side of the second 12 substrate are 89.0 degrees, and showing the results calculated by simulation under computation conditions that will be described in the following example. In FIG. 14, the solid line and the dashed line indicate the same things as in FIGS. 5 to 7. As shown in FIG. 14, in the liquid crystal display device according to the present embodiment, the maximum transmittance is sufficiently high, and the transmittance characteristics are good. In addition, even if the applied voltage is high, the transmittance difference between the front view (θ=0 degrees) and the oblique view (θ=45 degrees) is small, and the viewing angle characteristics are also good.

OTHER EMBODIMENTS

The present disclosure is not limited to the above embodiments, and may be implemented, for example, as follows.

In the second embodiment, the pretilt angle θ1 defined by the first alignment film 22 is less than 90 degrees, and the pretilt angle θ2 defined by the second alignment film 23 is substantially 90 degrees, but the pretilt angle θ2 defined by the second alignment film 23 may be less than 90 degrees, and the pretilt angle θ1 defined by the first alignment film 22 may be substantially 90 degrees.

In the above embodiment, as the pixel electrode 15, a case in which the slit 15a is formed on the entire surface of the pixel region has been described, but a slit may be formed only in a part of the pixel region (for example, the boundary part between two adjacent domains, and the outer edge part of the pixel 30 either in the vertical direction or the left to right direction).

Figure 15:
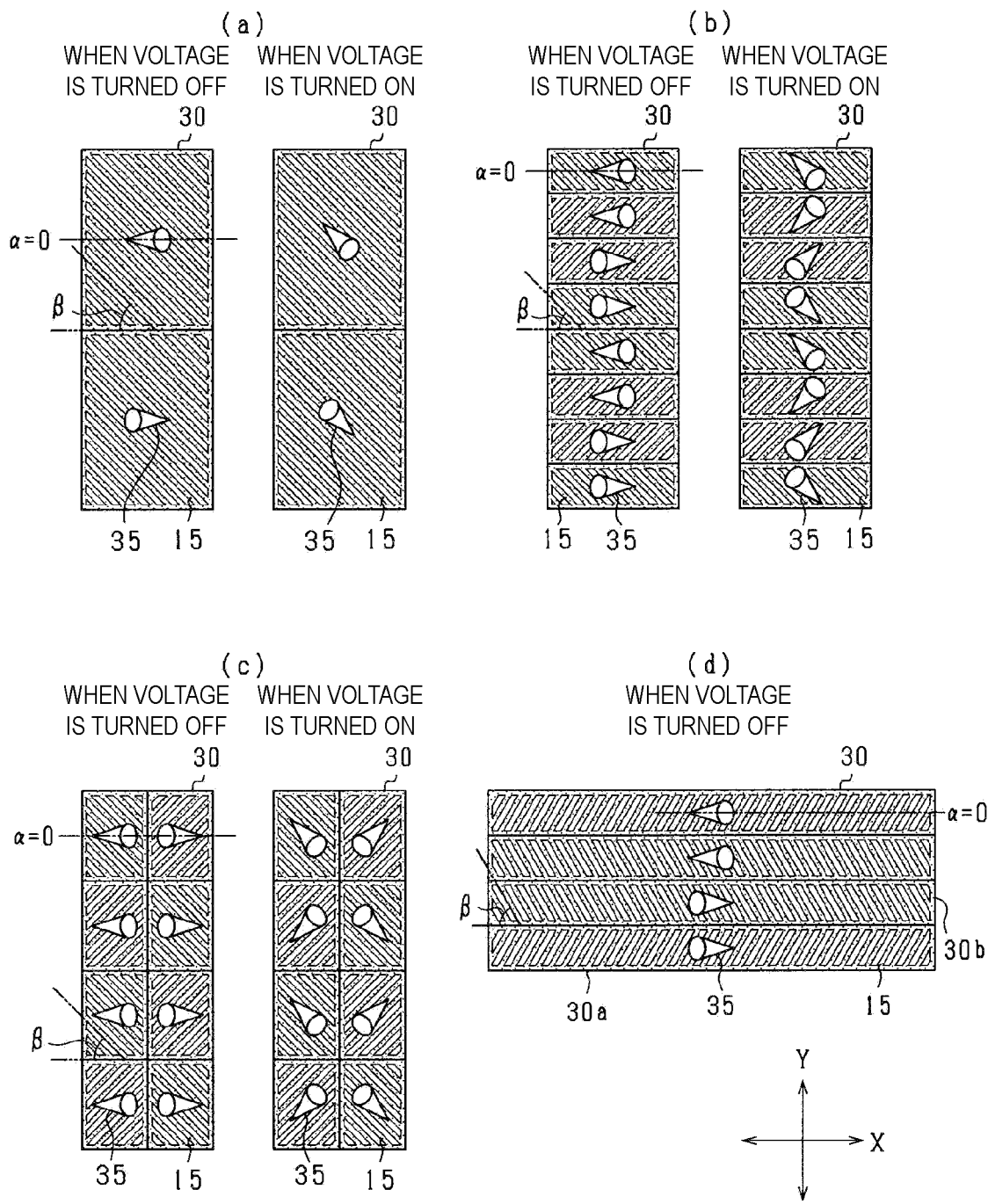
FIG. 15 shows schematic views of tilt orientations and alignment orientations of pixels of a liquid crystal display device according to another embodiment.

The number of alignment divisions of the pixel and the shape of the pixel are not limited to those of the configuration in the above embodiment. For example, as shown in (a) of FIG. 15, the present disclosure is applied to a liquid crystal display device in which one pixel is alignment-divided into two regions or as shown in (b) of FIG. 15 and (c) of FIG. 15, the present disclosure may be applied to a liquid crystal display device in which one pixel is alignment-divided into eight regions. In addition, as shown in (d) of FIG. 15, the present disclosure may be applied to a liquid crystal display device having a pixel including a short-side part in which each side of the pixel extends in the vertical direction and a long-side part in which each side of the pixel extends in the left to right direction.

In the first to fourth embodiments, when the electrode width of the pixel electrode 15 is L, the slit width is S, and the thickness (cell gap) of the liquid crystal layer 13 is d, it is preferable to satisfy L<1.1d, and S<d. When the electrode width (L), the slit width (S), and the thickness (d) of the liquid crystal layer 13 satisfy the above relationship, this is preferable because the liquid crystal display device 10 having a higher light transmittance can be obtained. Here, it is speculated that a preferable electrode width and slit width of the liquid crystal display device 10 change according to the change in the thickness of the liquid crystal layer 13 because an oblique electric field generated between electrodes due to the slit structure affects driving of the liquid crystal. In view of this point, when the thickness of the liquid crystal layer 13 and the electrode width and the slit width of the pixel electrode 15 are set so that the relationship (L<1.1d, S<d) is satisfied, a suitable oblique electric field can be obtained in a liquid crystal display device having a slit electrode, and a liquid crystal display device having excellent transmittance characteristics can be obtained.

In the above embodiment, the color filter is provided on the second substrate 12, but the color filter may be provided on the first substrate 11.

EXAMPLES

While the embodiments will be described below with reference to examples, the present disclosure should not be regarded as being limited to the following examples.

In the following examples, the weight average molecular weight Mw and the number average molecular weight Mn of the polymer, and the solution viscosity and the epoxy equivalent of the polymer solution were measured by the following methods. Required amounts of raw material compounds and polymers used in the following examples were secured by repeating synthesis on synthesis scale shown in the following synthesis examples as necessary.

[Weight Average Molecular Weight Mw and Number Average Molecular Weight Mn]

The weight average molecular weight Mw and the number average molecular weight Mn are polystyrene conversion values measured through GPC in the following conditions.

Column: TSKgelGRCXLII commercially available from Tosoh Corporation

Solvent: tetrahydrofuran

Temperature: 40° C.

Pressure: 68 kgf/cm$^2$

[Solution Viscosity of Polymer Solution]

The solution viscosity (mPa·s) of the polymer solution was measured using an E-type rotational viscometer at 25° C.

[Epoxy Equivalent]

The epoxy equivalent was measured by a hydrochloric acid-methyl ethyl ketone method according to JIS C 2105.

1. Synthesis of Polymer

Synthesis Example 1

Under a nitrogen atmosphere, 5.00 g of the compound represented by the following (MI-1), 0.64 g of 4-vinylbenzoic acid, 2.82 g of 4-(2,5-dioxo-3-pyrroline-1-yl)benzoic acid, 3.29 g of 4-(glysidyloxymethyl)styrene, 0.31 g of 2,2'-azobis(2,4-dimethylvaleronitrile) as a radical polymerization initiator, 0.52 g of 2,4-diphenyl-4-methyl-1-pentene as a chain transfer agent, and 25 ml of tetrahydrofuran as a solvent were put into a 100 mL two-neck flask, and the mixture was polymerized at 70° C. for 5 hours. The mixture was re-precipitated in n-hexane, the precipitate was then filtered, and vacuum-dried at room temperature for 8 hours, and thereby a styrene-maleimide-based polymer (referred to as a "polymer (PM-1)") was obtained. The weight average molecular weight Mw measured in terms of polystyrene through GPC was 30,000, and the molecular weight distribution Mw/Mn was 2.

[Chem. 1]

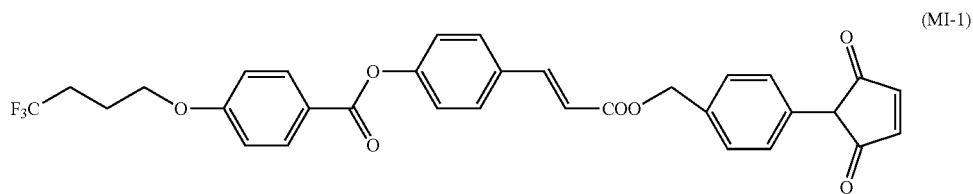

(MI-1)

Synthesis Example 2

Under a nitrogen atmosphere, 5.00 g of the compound represented by (MI-1), 0.86 g of methacrylic acid, 1.43 g of (oxolan-2-yl)methyl methacrylate, 0.39 g of 2,2'-azobis(2,4-dimethylvaleronitrile) as a radical polymerization initiator, 0.39 g of 2,4-diphenyl-4-methyl-1-pentene as a chain transfer agent, and 25 ml of tetrahydrofuran as a solvent were put into a 100 mL two-neck flask, and the mixture was polymerized at 70° C. for 5 hours. The mixture was re-precipitated in n-hexane, the precipitate was then filtered, and vacuum-dried at room temperature for 8 hours, and thereby a styrene-maleimide-based polymer (referred to as a "polymer (PM-2)") was obtained. The weight average molecular weight Mw measured in terms of polystyrene through GPC was 28,000, and the molecular weight distribution Mw/Mn was 1.8.

Synthesis Example 3

Under a nitrogen atmosphere, 3.00 g of the compound represented by the following (MI-2), 1.82 g of methacrylic acid, 3.01 g of (oxolan-2-yl)methyl methacrylate, 0.39 g of 2,2'-azobis(2,4-dimethylvaleronitrile) as a radical polymerization initiator, 0.39 g of 2,4-diphenyl-4-methyl-1-pentene as a chain transfer agent, and 25 ml of tetrahydrofuran as a solvent were put into a 100 mL two-neck flask, and the mixture was polymerized at 70° C. for 5 hours. The mixture was re-precipitated in n-hexane, the precipitate was then filtered, and vacuum-dried at room temperature for 8 hours, and thereby a styrene-maleimide-based polymer (referred to as a "polymer (PM-3)") was obtained. The weight average molecular weight Mw measured in terms of polystyrene through GPC was 27,000, and the molecular weight distribution Mw/Mn was 1.7.

[Chem. 2]

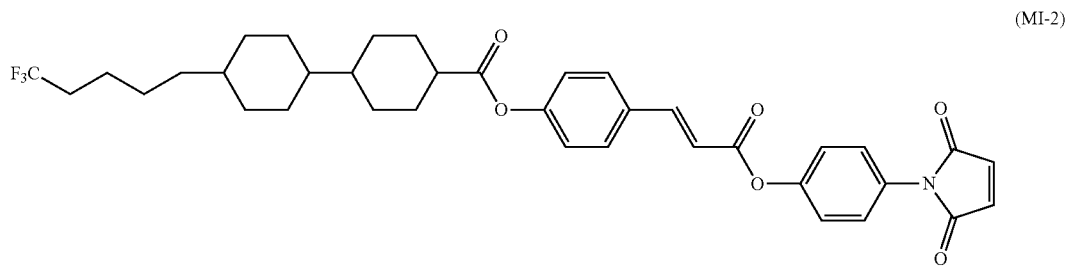

(MI-2)

Synthesis Example 4

70.0 mmol of 1,2,3,4-cyclobutanetetracarboxylic dianhydride, and 76.9 mmol of 2,2'-dimethyl-4,4'-diaminobiphenyl were dissolved in 170 g of N-methyl-2-pyrrolidone (NMP) and reacted at 25° C. for 3 hours, and thereby a solution containing 10 mass % of polyamic acid was obtained. Then, the polyamic acid solution was poured into a large excess of methanol, and the reaction product was precipitated. The obtained precipitate was washed with methanol and dried under a reduced pressure at 40° C. for 15 hours, and thereby a polyamic acid (referred to as a "polymer (PAA-1)") was obtained.

Synthesis Example 5

0.121 mol of 2,3,5-tricarboxycyclopentyl acetate dianhydride, 0.109 mol of 6-{[((2E)-3-{4-[(4-(3,3,3-trifluoropropoxy)benzoyl)oxy]phenyl}prop-2-enoyl)oxy]}hexy 1-3, 5-diaminobenzoate, 0.00604 mol of 5ξ-cholestan-3-yl 2,4-diaminophenyl ether, and 0.00604 mol of 3,5-diaminobenzoic acid=5ξ-cholestan-3-yl were dissolved in 185.7 g of N-methyl-2-pyrrolidone (NMP) and reacted at 60° C. for 24 hours. The viscosity of the polymer solution was measured as 2,100 mPa·s. Then, the polyamic acid solution was poured into a large excess of methanol, and the reaction product was precipitated. The obtained precipitate was washed with methanol and dried under a reduced pressure at 40° C. for 15 hours, and thereby a polyamic acid (referred to as a "polymer (PAA-2)") was obtained.

Synthesis Example 6

100.0 g of 2-(3,4-epoxycyclohexyl)ethyltrimethoxysilane, 500 g of methyl isobutyl ketone and 10.0 g of triethylamine were put into a reaction container including a stirrer, a thermometer, a dripping funnel and a reflux cooling pipe, and mixed at room temperature. Then, 100 g of deionized water was added dropwise from the dripping funnel over 30 minutes and the mixture was then reacted at 80° C. for 6 hours while being mixed under reflux. After the reaction was completed, an organic layer was extracted, washing was performed until water after washing with a 0.2 mass % ammonium nitrate aqueous solution became neutral, the solvent and water were then distilled off under a reduced pressure, and thereby a polyorganosiloxane (EPS-1) having an epoxy group was obtained as a viscous transparent liquid. The weight average molecular weight Mw of the obtained polyorganosiloxane (EPS-1) was 2,200, and the epoxy equivalent was 186 g/mol.

Then, 30.1 g of the polyorganosiloxane (EPS-1), 140 g of methyl isobutyl ketone, 31.9 g of a cinnamic acid derivative (A-1) represented by the following Formula (A-1) (corresponds to 50 mol % with respect to silicon atoms of the polyorganosiloxane (EPS-1)), 4.60 g of stearic acid (corresponds to 10 mol % with respect to silicon atoms of the polyorganosiloxane (EPS-1)), 0.0686 g of 3,5-dinitrobenzoic acid (corresponds to 0.2 mol % with respect to silicon atoms of the polyorganosiloxane (EPS-1)) and 3.00 g of tetrabutylammonium bromide were put into a 300 mL three-neck flask, and reacted at 80° C. for 5 hours with stirring. After the reaction was completed, the mixture was re-precipitated in methanol, and the precipitate was dissolved in ethyl acetate to obtain a solution. The obtained solution was washed with water five times, the solvent was then distilled off, and thereby 55.6 g of white powder of the polymer (PS-1) having a weight average molecular weight (Mw) of 12,600 (Mw/Mn=1.42) was obtained as a radiation-sensitive polyorganosiloxane.

[Chem. 3]

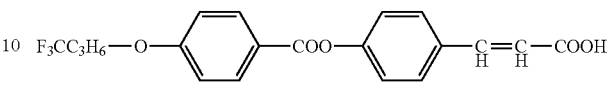

(A-1)

2. Production and Evaluation of Liquid Crystal Display Device

Example 1

1. Preparation of Liquid Crystal Alignment Agent

NMP and Butyl CELLOSOLVE (BC) were added as solvents to 80 parts by mass of the polymer (PAA-1) and 20 parts by mass of the polymer (PAA-2) to obtain a solution having a solvent composition of NMP/BC=50/50 (mass ratio) and a solid content concentration of 4.0 mass %. This solution was filtered with a filter having a pore size of 1 μm to prepare a liquid crystal alignment agent (AL-1).

2. Production of Liquid Crystal Display Device

A liquid crystal display device was produced using a TFT substrate and a CF substrate. As a pixel electrode of the TFT substrate, a slit electrode having an angle (slit angle β) of 45 degrees formed by the transverse direction of pixel and the direction in which the slit extends, an electrode width (L) of 3.5 μm, and a slit width (S) of 2.5 μm was used (refer to FIG. 3, the same applies to the following Examples 2 to 10 and Comparative Examples 1 to 6). As a counter electrode of the CF substrate, a solid electrode in which no slit was formed was used. The liquid crystal alignment agent (AL-1) was applied to the surfaces of the TFT substrate and the CF substrate on which each electrode was arranged by a spin casting method. This was pre-caked at 80° C. for 1 minute, and then post-baked at 230° C. for 40 minutes, and a coating film having a film thickness of 120 nm was formed. Subsequently, scan exposure was performed on the coating film (liquid crystal alignment film) formed on the TFT substrate. According to FIG. 3, in the scan exposure, 313 nm linearly polarized light was emitted at an intensity of 20 mJ/cm² a total of 4 times so that four domains in which the alignment orientations of liquid crystal molecules when the voltage was turned on were different from each other were formed in one pixel and the exposure orientation of each domain was 10 degrees with respect to the transverse direction of each pixel. In addition, scan exposure was performed on the coating film (liquid crystal alignment film) formed on the CF substrate in the same manner as in the TFT substrate.

Subsequently, on the surface of the TFT substrate on which the liquid crystal alignment film was formed, a nematic liquid crystal having negative dielectric anisotropy was added dropwise, and a thermosetting epoxy resin was provided as a sealing material on the outer edge part of the CF substrate. Then, the TFT substrate and the CF substrate were bonded together so that the alignment film surfaces were inside each other. Subsequently, the epoxy resin was cured by heating at 130° C. for 1 hour to obtain a liquid crystal cell. In addition, in order to remove flow alignment when the liquid crystal was injected, the liquid crystal cell was heated at 150° C. and then slowly cooled to room temperature. Then, a polarizing plate was bonded to both outer sides of the substrate of the liquid crystal cell so that transmission axes thereof were orthogonal to each other to obtain an optical vertical type liquid crystal display device. The pretilt angle of the obtained liquid crystal display device was 89.0 degrees on both the side of the TFT substrate and the side of the CF substrate. The angle (liquid crystal projection angle α) formed by the alignment orientation of the liquid crystal layer and the transverse direction of the pixels when the voltage was turned off was 10 degrees. Here, the pretilt angle was a value measured using OPTI-Pro (commercially available from Shintec Corporation) (the same applies hereinafter).

3. Evaluation of Transmittance Characteristics (1) Computation of Transmittance

The transmittance of the liquid crystal display device produced in the above 1 was calculated by simulation using Expert LCD (commercially available from LinkGlobal21). As computation conditions, liquid crystal physical properties: $\Delta\varepsilon=3$, Ne=1.6, No=1.5, cell gap: 3.4 μm, and pretilt angle: measured value (89.0° in Example 1) were applied. The results are shown in FIG. 5. Here, FIG. 5 shows a transmittance (indicated by a solid line) when the liquid crystal display device was observed in the front direction (polar angle θ=0 degrees and azimuth angle φ=0 degrees) and a transmittance (indicated by a dashed line) when the liquid crystal display device was observed in the oblique direction (polar angle θ=45 degrees and azimuth angle φ=0 degrees).

(2) Evaluation According to Maximum Transmittance

Based on the results of the above (1) (FIG. 5), the transmittance characteristics were evaluated by the maximum transmittance of the liquid crystal display device. When the maximum transmittance at the polar angle θ=0 degrees and the azimuth angle φ=0 degrees was 0.280 or more, the transmittance characteristics were evaluated as "good", and when the maximum transmittance was less than 0.280, the transmittance characteristics were evaluated as "poor." In this example, the maximum transmittance was 0.314, and the transmittance characteristics were determined as "good."

(3) Evaluation According to Transmittance Ratio

Based on the results of the above (1) (FIG. 5), the transmittance ratio α(V) of a voltage $V_{100}$ at which the maximum brightness reached and a voltage $V_{20}$ at which the brightness became 20% of the maximum brightness, was calculated by the following Formula (1), and viewing angle characteristics were evaluated by the transmittance ratio α(V).

$$\alpha(V) = \text{(transmittance at the polar angle θ=0 and the azimuth angle φ=0)/(transmittance at the polar angle θ=45 and the azimuth angle φ=0)} \quad (1)$$

It can be said that, when the transmittance ratio α(V) was closer to 1, the difference between the transmittance when the display region was viewed from the front and the transmittance when the display region was viewed in the oblique direction was smaller, and viewing angle characteristics were excellent. When both the transmittance ratio $\alpha(V_{100})$ at the voltage $V_{100}$ at which the maximum brightness reached and the transmittance ratio $\alpha(V_{20})$ at the voltage $V_{20}$ at which the brightness became 20% of the maximum brightness were within a range of 0.80 to 1.15, it was evaluated as "good" and when at least one of the transmittance ratio $\alpha(V_{100})$ at the voltage $V_{100}$ and the transmittance ratio $\alpha(V_{20})$ at the voltage $V_{20}$ was less than 0.80 or larger than 1.15, it was evaluated as "poor." In this example, the transmittance ratio $\alpha(V_{100})$ at the voltage $V_{100}$ was 1.08, the transmittance ratio $\alpha(V_{20})$ at the voltage $V_{20}$ was 1.01, and the viewing angle characteristics were determined as "good."

Example 2

1. Preparation of Liquid Crystal Alignment Agent

NMP and BC as solvents were added to 10 parts by mass of the polymer (PS-1) and 100 parts by mass of the polymer (PAA-1) to obtain a solution having a solvent composition of NMP/BC=50/50 (mass ratio) and a solid content concentration of 4.0 mass %. This solution was filtered with a filter having a pore size of 1 μm to prepare a liquid crystal alignment agent (AL-2).

2. Production of Liquid Crystal Display Device

Figure 16:
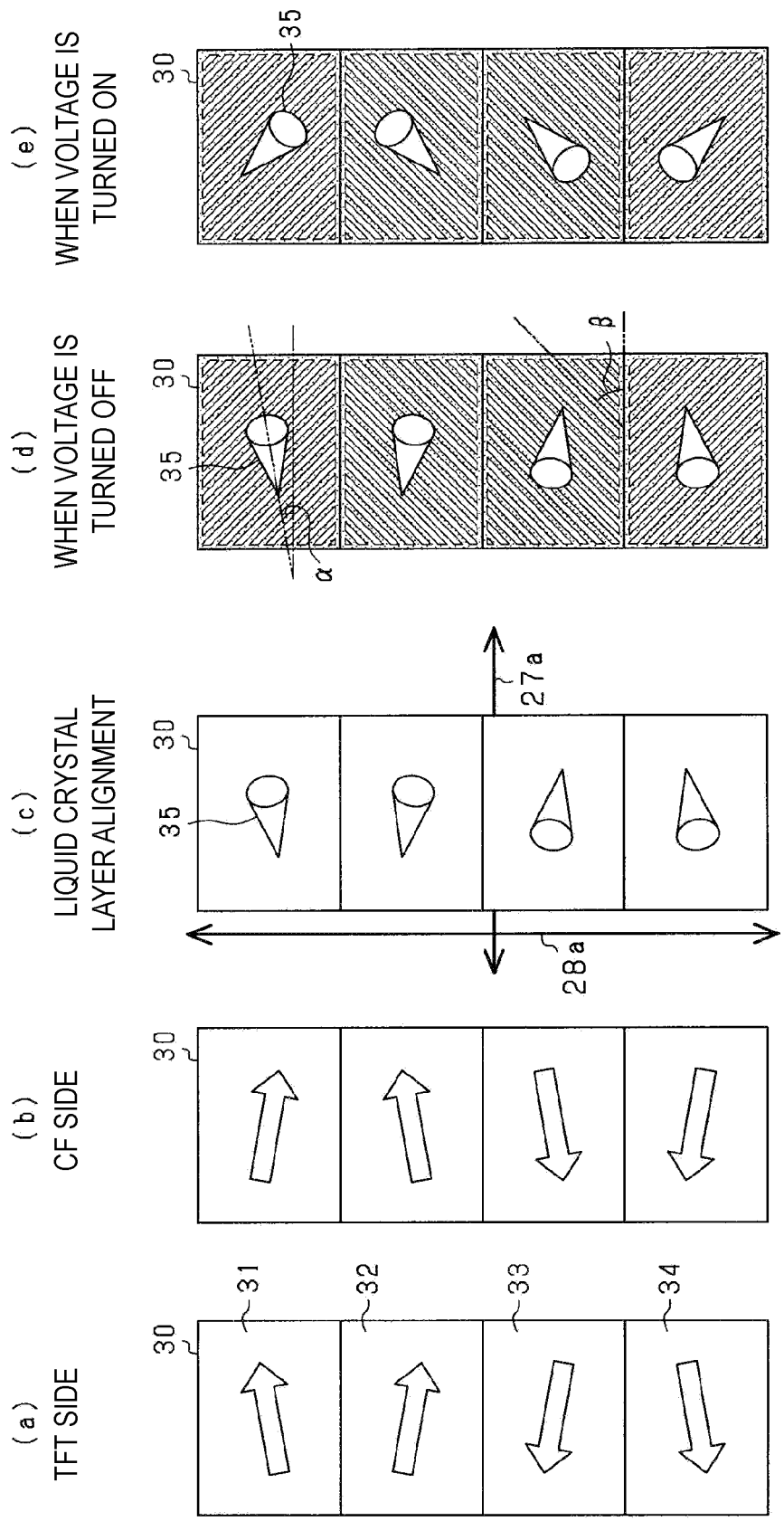
FIG. 16 shows schematic views of tilt orientations and alignment orientations of pixels of a liquid crystal display device of Example 2.

An optical vertical type liquid crystal display device in FIG. 16 was produced in the same manner as in Example 1 except that the liquid crystal alignment agent (AL-2) was used in place of the liquid crystal alignment agent (AL-1) and the exposure orientations of the first to fourth domains changed so that the tilt orientation was the orientation shown in (a) and (b) of FIG. 16. The pretilt angle of the obtained liquid crystal display device was 89.0 degrees on both the side of the TFT substrate and the side of the CF substrate. The liquid crystal projection angle α was 10 degrees.

3. Evaluation of Transmittance Characteristics

In the same manner as in Example 1, the transmittance of the liquid crystal display device produced in the above 2. was calculated by simulation. As a result, in this example, the maximum transmittance at the polar angle θ=0 degrees and the azimuth angle φ=0 degrees was 0.285, and the transmittance characteristics were determined as "good." In addition, the transmittance ratio $\alpha(V_{100})$ at the voltage $V_{100}$ was 1.04, the transmittance ratio $\alpha(V_{20})$ at the voltage $V_{20}$ was 1.11, and the viewing angle characteristics were determined as "good."

Example 3

1. Production of Liquid Crystal Display Device

An optical vertical type liquid crystal display device in FIG. 4 was produced in the same manner as in Example 1 except that the exposure orientations of the first to fourth domain changed so that the tilt orientation was the orientation shown in (a) and (b) of FIG. 4. The pretilt angle of the obtained liquid crystal display device was 89.0 degrees on both the side of the TFT substrate and the side of the CF substrate. The liquid crystal projection angle α was 0 degrees. Here, the scan exposure was performed twice on each substrate (a total of four times).

2. Evaluation of Transmittance Characteristics

In the same manner as in Example 1, the transmittance of the liquid crystal display device produced in the above 1. was calculated by simulation. As a result, in this example, the maximum transmittance at the polar angle θ=0 degrees and the azimuth angle φ=0 degrees was 0.312, and the transmittance characteristics were determined as "good." In addition, the transmittance ratio $\alpha(V_{100})$ at the voltage $V_{100}$ was 1.07, the transmittance ratio $\alpha(V_{20})$ at the voltage $V_{20}$ was 1.09, and the viewing angle characteristics were determined as "good."

Example 4

1. Production of Liquid Crystal Display Device

An optical vertical type liquid crystal display device in FIG. 4 was produced in the same manner as in Example 1 except that the liquid crystal alignment agent (AL-2) was used in place of the liquid crystal alignment agent (AL-1), the slit angle β was 60 degrees, and the exposure orientations of the first to fourth domain changed so that the tilt orientation was the orientation shown in (a) and (b) of FIG. 4. The pretilt angle of the obtained liquid crystal display device was 89.0 degrees on both the side of the TFT substrate and the side of the CF substrate. The liquid crystal projection angle α was 0 degrees.

2. Evaluation of Transmittance Characteristics

In the same manner as in Example 1, the transmittance of the liquid crystal display device produced in the above 1. was calculated by simulation, and thus the results in FIG. 6 were obtained. In this example, the maximum transmittance at the polar angle θ=0 degrees and the azimuth angle φ=0 degrees was 0.313, and the transmittance characteristics were determined as "good." In addition, the transmittance ratio α($V_{100}$) at the voltage $V_{100}$ was 1.12, the transmittance ratio α($V_{20}$) at the voltage $V_{20}$ was 1.12, and the viewing angle characteristics were determined as "good."

Example 5

1. Preparation of Liquid Crystal Alignment Agent

NMP and BC as solvents were added to 10 parts by mass of the polymer (PM-3) and 100 parts by mass of the polymer (PAA-1) to obtain a solution having a solvent composition of NMP/BC=50/50 (mass ratio) and a solid content concentration of 4.0 mass %. This solution was filtered with a filter having a pore size of 1 μm to prepare a liquid crystal alignment agent (AL-3).

2. Production of Liquid Crystal Display Device

An optical vertical type liquid crystal display device in FIG. 4 was produced in the same manner as in Example 1 except that the liquid crystal alignment agent (AL-3) was used in place of the liquid crystal alignment agent (AL-1), the slit angle β was 60 degrees, and the exposure orientations of the first to fourth domain changed so that the tilt orientation was the orientation shown in (a) and (b) of FIG. 4. The pretilt angle of the obtained liquid crystal display device was 87.0 degrees on both the side of the TFT substrate and the side of the CF substrate. The liquid crystal projection angle α was 0 degrees.

3. Evaluation of Transmittance Characteristics

In the same manner as in Example 1, the transmittance of the liquid crystal display device produced in the above 2. was calculated by simulation. As a result, in this example, the maximum transmittance at the polar angle θ=0 degrees and the azimuth angle φ=0 degrees was 0.314, and the transmittance characteristics were determined as "good." In addition, the transmittance ratio α($V_{100}$) at the voltage $V_{100}$ was 1.09, the transmittance ratio α($V_{20}$) at the voltage $V_{20}$ was 1.04, and the viewing angle characteristics were determined as "good."

Example 6

1. Production of Liquid Crystal Display Device

An optical vertical type liquid crystal display device in FIG. 10 was produced in the same manner as in Example 1 except that the liquid crystal alignment agent (AL-3) was used in place of the liquid crystal alignment agent (AL-1), the slit angle β was 60 degrees, and exposure was performed only on the TFT substrate so that the tilt orientation was the orientation shown in (a) of FIG. 10. The pretilt angle of the obtained liquid crystal display device was 87.0 degrees on the side of the TFT substrate and 90 degrees on the side of the CF substrate. The liquid crystal projection angle α was 0 degrees.

2. Evaluation of Transmittance Characteristics

In the same manner as in Example 1, the transmittance of the liquid crystal display device produced in the above 2. was calculated by simulation, and thus the results in FIG. 11 were obtained. In this example, the maximum transmittance at the polar angle θ=0 degrees and the azimuth angle φ=0 degrees was 0.313, and the transmittance characteristics were determined as "good." In addition, the transmittance ratio α($V_{100}$) at the voltage $V_{100}$ was 1.12, the transmittance ratio α($V_{20}$) at the voltage $V_{20}$ was 1.04, and the viewing angle characteristics were determined as "good."

Example 7

1. Preparation of Liquid Crystal Alignment Agent

NMP and BC as solvents were added to 10 parts by mass of the polymer (PM-1) and 100 parts by mass of the polymer (PAA-1) to obtain a solution having a solvent composition of NMP/BC=50/50 (mass ratio) and a solid content concentration of 4.0 mass %. This solution was filtered with a filter having a pore size of 1 μm to prepare a liquid crystal alignment agent (AL-4).

2. Production of Liquid Crystal Display Device

Figure 17:
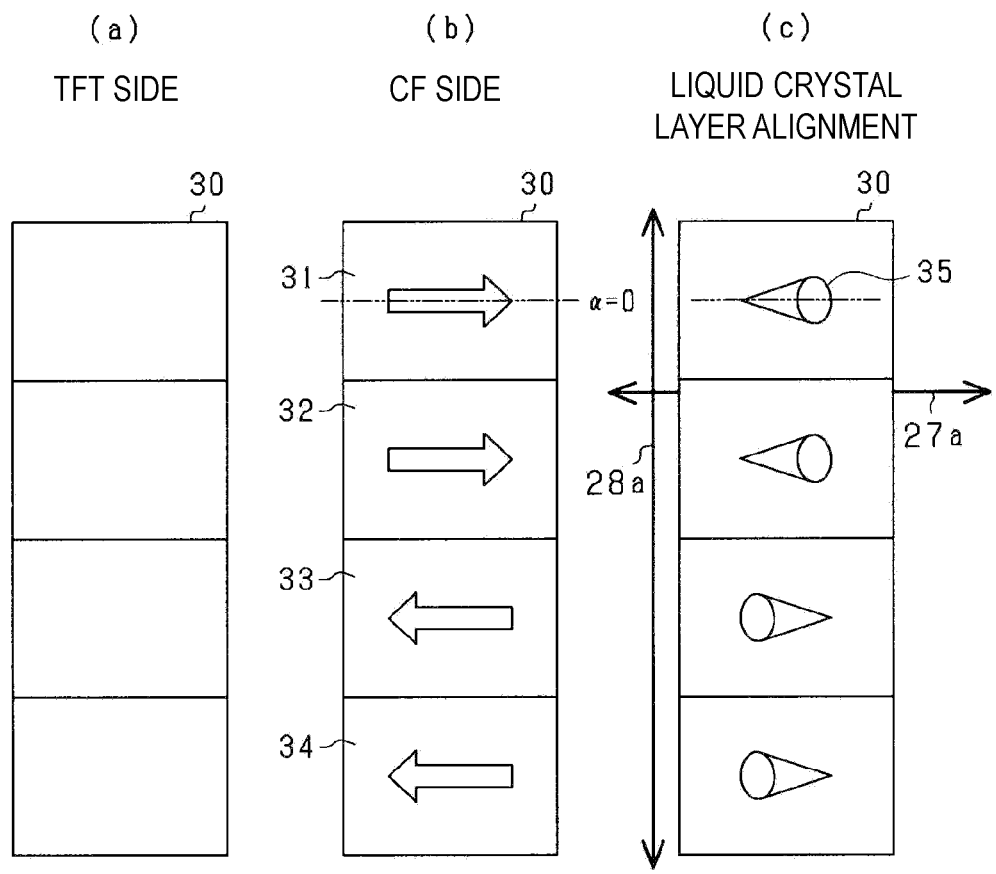
FIG. 17 shows schematic views of tilt orientations and alignment orientations of pixels of a liquid crystal display device of Example 7.

An optical vertical type liquid crystal display device in FIG. 17 was produced in the same manner as in Example 1 except that the liquid crystal alignment agent (AL-4) was used in place of the liquid crystal alignment agent (AL-1), and exposure was performed only on the CF substrate so that the tilt orientation was the orientation shown in (b) of FIG. 17. The pretilt angle of the obtained liquid crystal display device was 90 degrees on the side of the TFT substrate and 88.0 degrees on the side of the CF substrate. The liquid crystal projection angle α was 0 degrees.

3. Evaluation of Transmittance Characteristics

In the same manner as in Example 1, the transmittance of the liquid crystal display device produced in the above 2. was calculated by simulation. As a result, in this example, the maximum transmittance at the polar angle θ=0 degrees and the azimuth angle φ=0 degrees was 0.310, and the transmittance characteristics were determined as "good." In addition, the transmittance ratio α($V_{100}$) at the voltage $V_{100}$ was 1.07, the transmittance ratio α($V_{20}$) at the voltage $V_{20}$ was 1.12, and the viewing angle characteristics were determined as "good."

Example 8

1. Production of Liquid Crystal Display Device

Figure 18:
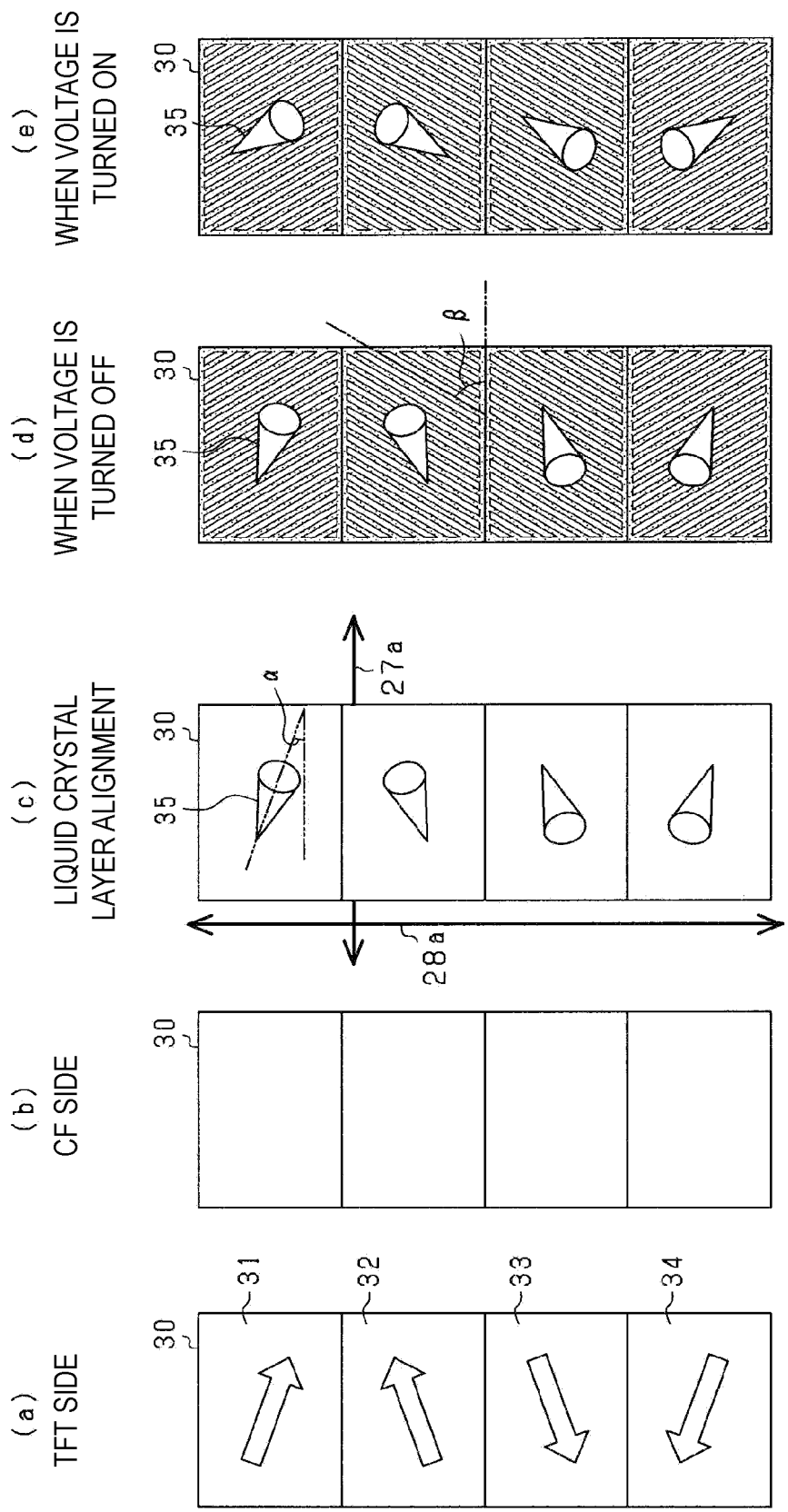
FIG. 18 shows schematic views of tilt orientations and alignment orientations of pixels of a liquid crystal display device of Example 8.

An optical vertical type liquid crystal display device in FIG. 18 was produced in the same manner as in Example 1 except that the liquid crystal alignment agent (AL-4) was used in place of the liquid crystal alignment agent (AL-1), the slit angle θ was 60 degrees, and exposure was performed only on the TFT substrate so that the tilt orientation was the orientation shown in (a) of FIG. 18. The pretilt angle of the obtained liquid crystal display device was 88.0 degrees on the side of the TFT substrate and 90 degrees on the side of the CF substrate. The liquid crystal projection angle α was 20 degrees.

2. Evaluation of Transmittance Characteristics

In the same manner as in Example 1, the transmittance of the liquid crystal display device produced in the above 1. was calculated by simulation. In this example, the maximum transmittance at the polar angle θ=0 degrees and the azimuth angle φ=0 degrees was 0.306, and the transmittance characteristics were determined as "good." In addition, the transmittance ratio α($V_{100}$) at the voltage $V_{100}$ was 1.11, the transmittance ratio α($V_{20}$) at the voltage $V_{20}$ was 0.84, and the viewing angle characteristics were determined as "good."

Example 9

1. Production of Liquid Crystal Display Device

Figure 19:
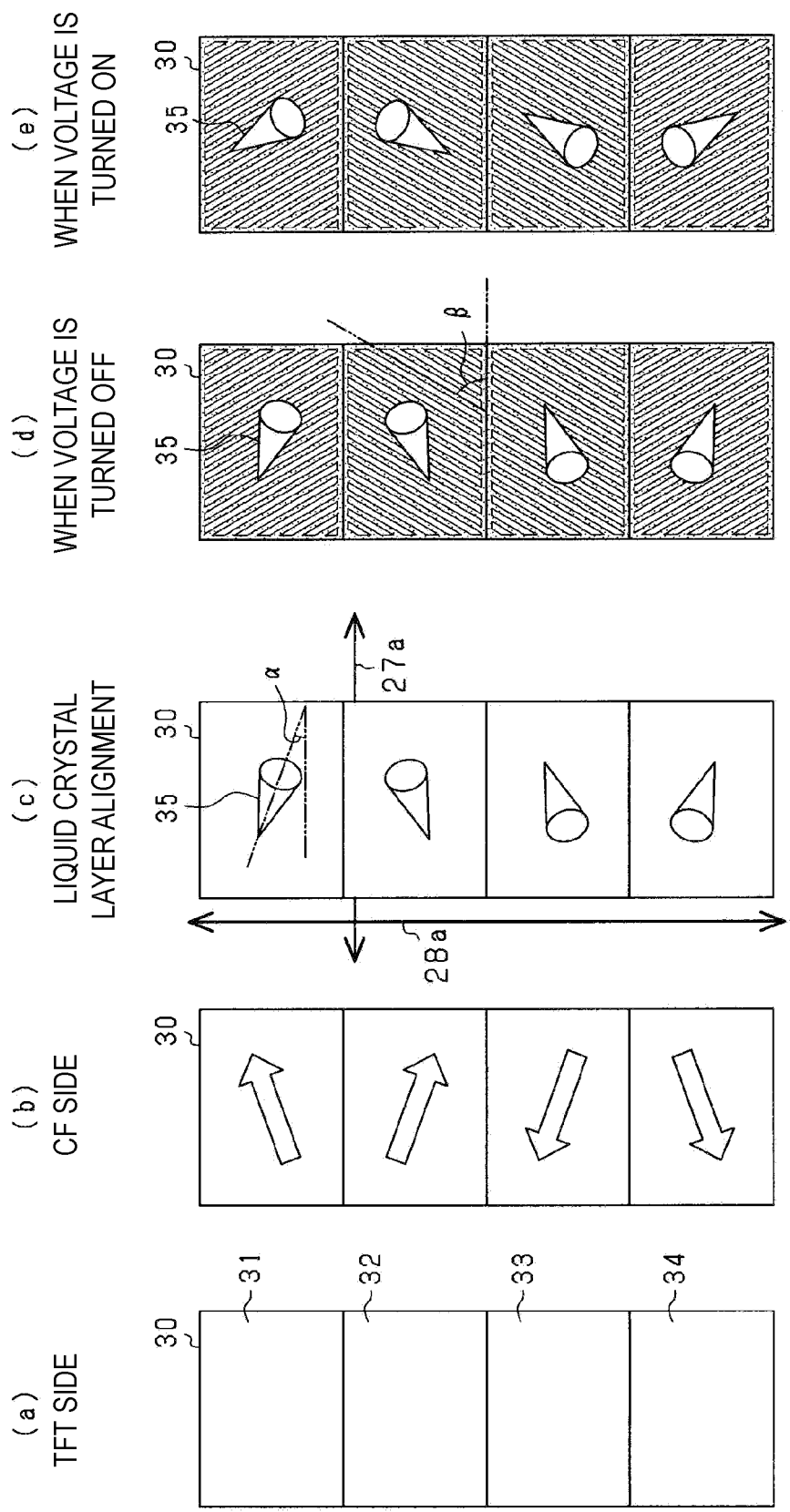
FIG. 19 shows schematic views of tilt orientations and alignment orientations of pixels of a liquid crystal display device of Example 9.

An optical vertical type liquid crystal display device in FIG. 19 was produced in the same manner as in Example 1 except that the liquid crystal alignment agent (AL-4) was used in place of the liquid crystal alignment agent (AL-1), the slit angle θ was 60 degrees, and exposure was performed only on the CF substrate so that the tilt orientation was the orientation shown in (b) of FIG. 19. The pretilt angle of the obtained liquid crystal display device was 90 degrees on the side of the TFT substrate and 88.0 degrees on the side of the CF substrate. The liquid crystal projection angle α was 20 degrees.

2. Evaluation of Transmittance Characteristics

In the same manner as in Example 1, the transmittance of the liquid crystal display device produced in the above 1. was calculated by simulation. In this example, the maximum transmittance at the polar angle θ=0 degrees and the azimuth angle φ=0 degrees was 0.308, and the transmittance characteristics were determined as "good." In addition, the transmittance ratio α($V_{100}$) at the voltage $V_{100}$ was 1.11, the transmittance ratio α($V_{20}$) at the voltage $V_{20}$ was 0.85, and the viewing angle characteristics were determined as "good."

Example 10

1. Production of Liquid Crystal Display Device

An optical vertical type liquid crystal display device in FIG. 13 was produced in the same manner as in Example 1 except that divided exposure was performed on the coating film on the side of the TFT substrate and the side of the CF substrate so that the tilt orientation was the orientation shown in FIG. 13. The pretilt angle of the obtained liquid crystal display device was 89.0 degrees on both the side of the TFT substrate and the side of the CF substrate. The liquid crystal projection angle α was 0 degrees.

2. Evaluation of Transmittance Characteristics

In the same manner as in Example 1, the transmittance of the liquid crystal display device produced in the above 1. was calculated by simulation, and thus the results in FIG. 14 were obtained. In this example, the maximum transmittance at the polar angle θ=0 degrees and the azimuth angle φ=0 degrees was 0.321, and the transmittance characteristics were determined as "good." In addition, the transmittance ratio α($V_{100}$) at the voltage $V_{100}$ was 1.09, the transmittance ratio α($V_{20}$) at the voltage $V_{20}$ was 1.14, and the viewing angle characteristics were determined as "good."

The liquid crystal alignment agents used in Examples 1 to 10, and the liquid crystal projection angle α, the slit angle θ, the angle γ formed by the alignment orientation of the liquid crystal layer when the voltage was turned off and the slit direction, and the transmittance ratio α(V) of the liquid crystal display devices are summarized in the following Table 1. Here, the liquid crystal projection angle α was equal to an angle formed by the alignment orientation of the liquid crystal layer when the voltage was turned off and the direction in which the transmission axis of the polarizing plate on the side of the TFT substrate extended. The slit angle β was equal to an angle formed by the slit direction and the direction in which the transmission axis of the polarizing plate on the side of the TFT substrate extended.

TABLE 1

|  | Alignment agent | Liquid crystal projection angle α | Slit angle β | Angle γ | Maximum transmittance | α($V_{100}$) | α($V_{20}$) |
|---|---|---|---|---|---|---|---|
| Example 1 | AL-1 | 10° | 45° | 35° | 0.314 | 1.08 | 1.01 |
| Example 2 | AL-2 | 10° | 45° | 55° | 0.285 | 1.04 | 1.11 |
| Example 3 | AL-1 | 0° | 45° | 45° | 0.312 | 1.07 | 1.09 |
| Example 4 | AL-2 | 0° | 60° | 60° | 0.313 | 1.12 | 1.12 |
| Example 5 | AL-3 | 0° | 60° | 60° | 0.314 | 1.09 | 1.04 |
| Example 6 | AL-3 | 0° | 60° | 60° | 0.313 | 1.12 | 1.04 |
| Example 7 | AL-4 | 0° | 45° | 45° | 0.310 | 1.07 | 1.12 |
| Example 8 | AL-4 | 20° | 60° | 40° | 0.306 | 1.11 | 0.84 |
| Example 9 | AL-4 | 20° | 60° | 40° | 0.308 | 1.11 | 0.85 |
| Example 10 | AL-1 | 0° | 45° | 45° | 0.321 | 1.09 | 1.14 |

Comparative Example 1

1. Production of Liquid Crystal Display Device

Figure 20:
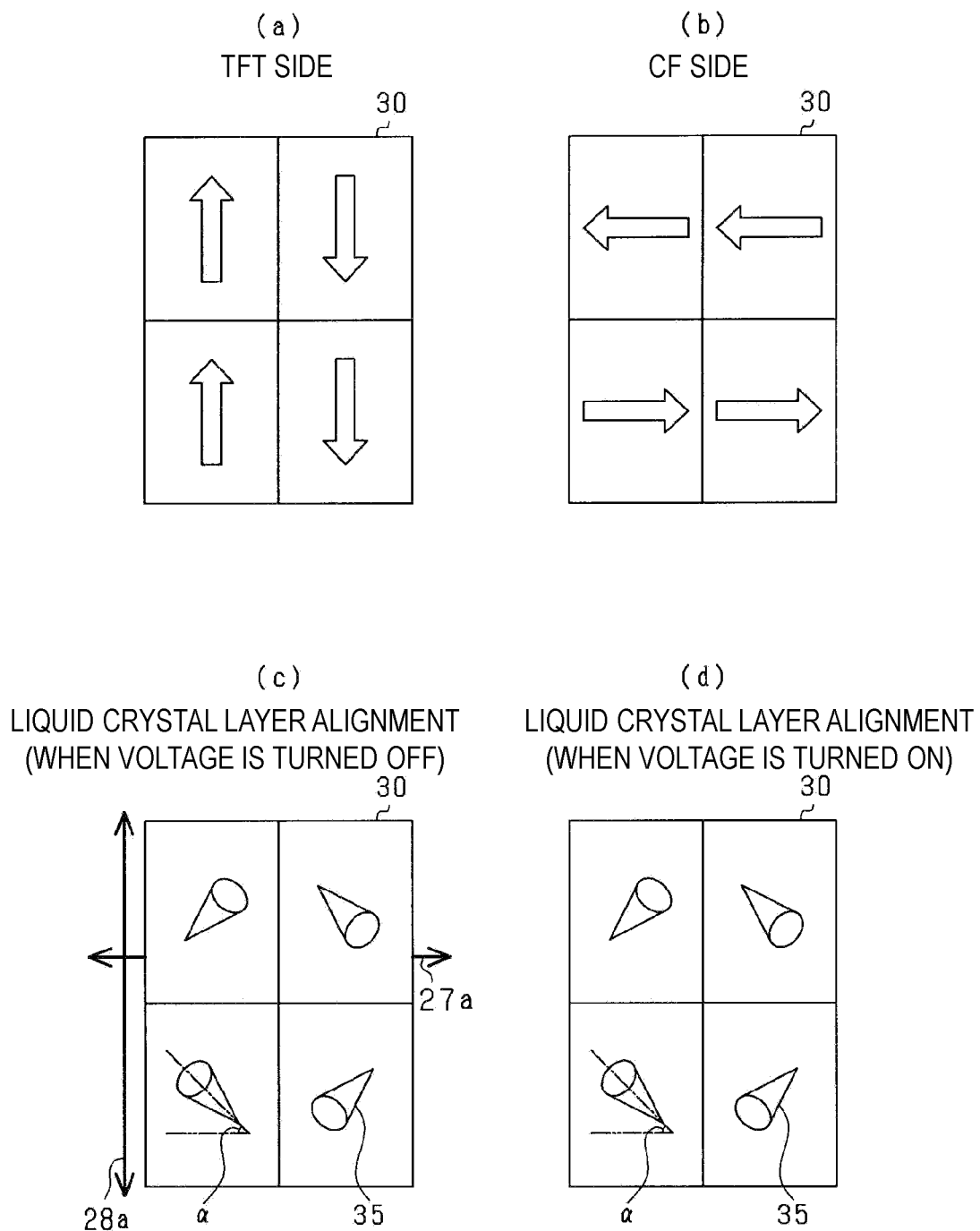
FIG. 20 shows schematic views of tilt orientations and alignment orientations of pixels of liquid crystal display devices of Comparative Example 1 and Comparative Example 2.

An optical vertical type liquid crystal display device was produced in the same manner as in Example 1 except that a solid electrode on which no slit was provided was used as the TFT substrate and the CF substrate, and divided exposure was performed on the coating film on the side of the TFT substrate and the side of the CF substrate so that the tilt orientation was the orientation indicated by the white arrow shown in (a) and (b) of FIG. of 20 (FIG. 20). The pretilt angle of the obtained liquid crystal display device was 89.0 degrees on both the side of the TFT substrate and the side of the CF substrate. The liquid crystal projection angle α was 45 degrees. Here, (a) to (c) of FIG. 20 are the same as those of FIG. 3, and (d) show the alignment orientation of the liquid crystal layer 13 when the voltage was turned on.

2. Evaluation of Transmittance Characteristics

In the same manner as in Example 1, the transmittance of the liquid crystal display device produced in the above 1. was calculated by simulation. In this example, the maximum transmittance at the polar angle θ=0 degrees and the azimuth angle φ=0 degrees was 0.243, and the transmittance characteristics were determined as "poor." In addition, the transmittance ratio α($V_{100}$) at the voltage $V_{100}$ was 1.12, the transmittance ratio α($V_{20}$) at the voltage $V_{20}$ was 0.74, and the viewing angle characteristics were determined as "poor."

Comparative Example 2

1. Preparation of Liquid Crystal Alignment Agent

NMP and BC as solvents were added to 10 parts by mass of the polymer (PM-2) and 100 parts by mass of the polymer (PAA-1) to obtain a solution having a solvent composition of NMP/BC=50/50 (mass ratio) and a solid content concentration of 4.0 mass %. This solution was filtered with a filter having a pore size of 1 μm to prepare a liquid crystal alignment agent (AL-5).

2. Production of Liquid Crystal Display Device

An optical vertical type liquid crystal display device was produced in the same manner as in Example 1 except that a solid electrode on which no slit was provided was used as the TFT substrate and the CF substrate, the liquid crystal alignment agent (AL-5) was used in place of the liquid crystal alignment agent (AL-1), and divided exposure was performed on the coating film on the side of the TFT substrate and the side of the CF substrate so that the tilt orientation was the orientation shown in FIG. 20 (FIG. 20). The pretilt angle of the obtained liquid crystal display device was 86.0 degrees both on the side of the TFT substrate and the side of the CF substrate. The liquid crystal projection angle α was 45 degrees.

3. Evaluation of Transmittance Characteristics

In the same manner as in Example 1, the transmittance of the liquid crystal display device produced in the above 2. was calculated by simulation. In this example, the maximum transmittance at the polar angle θ=0 degrees and the azimuth angle φ=0 degrees was 0.288, and the transmittance characteristics were determined as "good." On the other hand, the transmittance ratio $α(V_{100})$ at the voltage $V_{100}$ was 1.12, the transmittance ratio $α(V_{20})$ at the voltage $V_{20}$ was 0.65, and the viewing angle characteristics were determined as "poor."

Comparative Example 3

1. Production of Liquid Crystal Display Device

Figure 8:
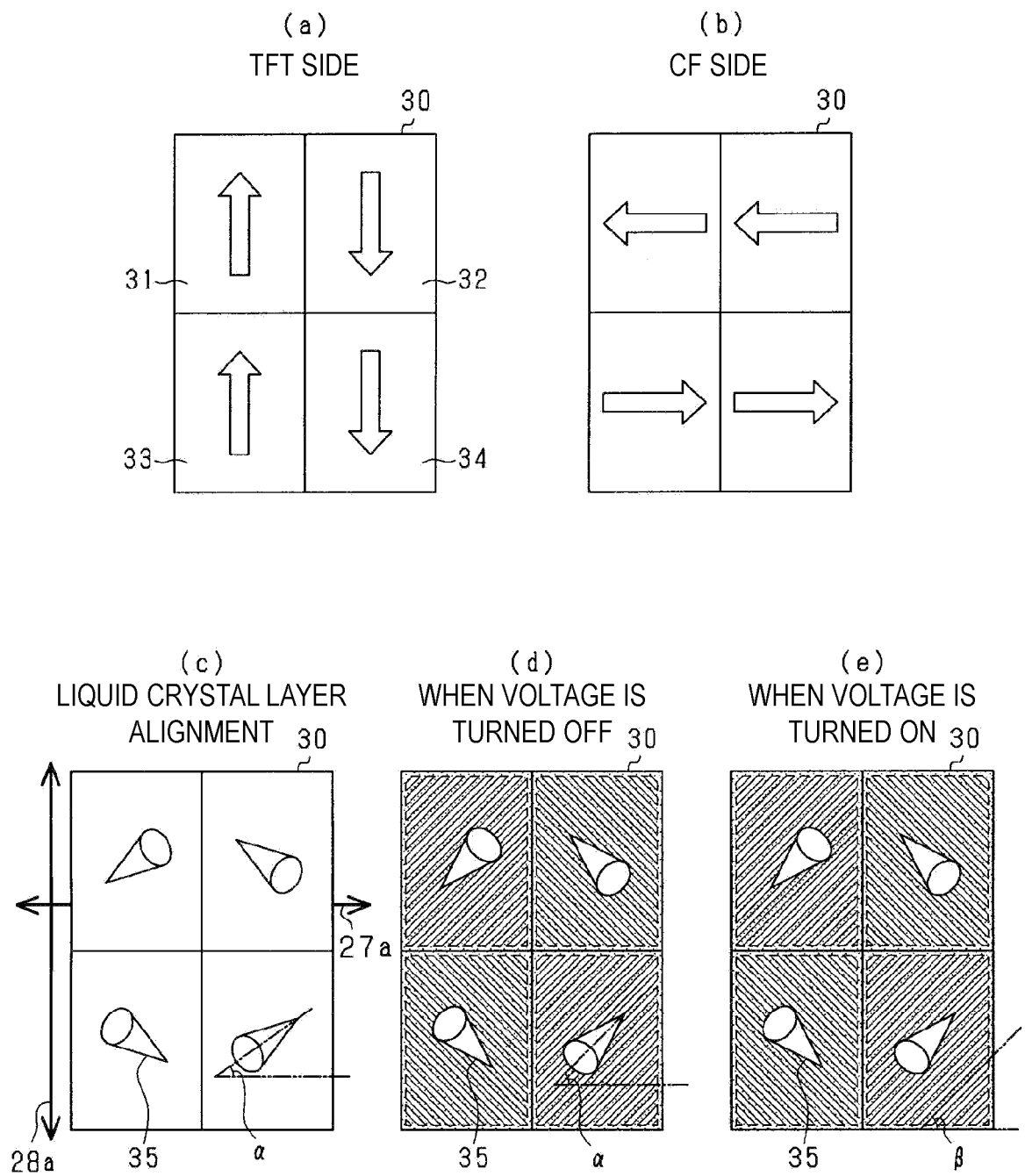
FIG. 8 shows schematic views of tilt orientations and alignment orientations in pixels of a liquid crystal display device of a comparative example (Comparative Example 3).

An optical vertical type liquid crystal display device was produced in the same manner as in Example 1 except that divided exposure was performed on the coating film on the side of the TFT substrate and the side of the CF substrate so that the tilt orientation was the orientation indicated by the white arrow in (a) and (b) of FIG. 8. The pretilt angle of the obtained liquid crystal display device was 89.0 degrees on both the side of the TFT substrate and the side of the CF substrate. The liquid crystal projection angle α was 45 degrees.

2. Evaluation of Transmittance Characteristics

In the same manner as in Example 1, the transmittance of the liquid crystal display device produced in the above 1. was calculated by simulation, and thus the results in FIG. 7 were obtained. In this example, the maximum transmittance at the polar angle θ=0 degrees and the azimuth angle φ=0 degrees was 0.306, and the transmittance characteristics were determined as "good." On the other hand, the transmittance ratio $α(V_{100})$ at the voltage $V_{100}$ was 1.12, the transmittance ratio $α(V_{20})$ at the voltage $V_{20}$ was 0.69, and the viewing angle characteristics were determined as "poor."

Comparative Example 4

1. Production of Liquid Crystal Display Device

Figure 21:
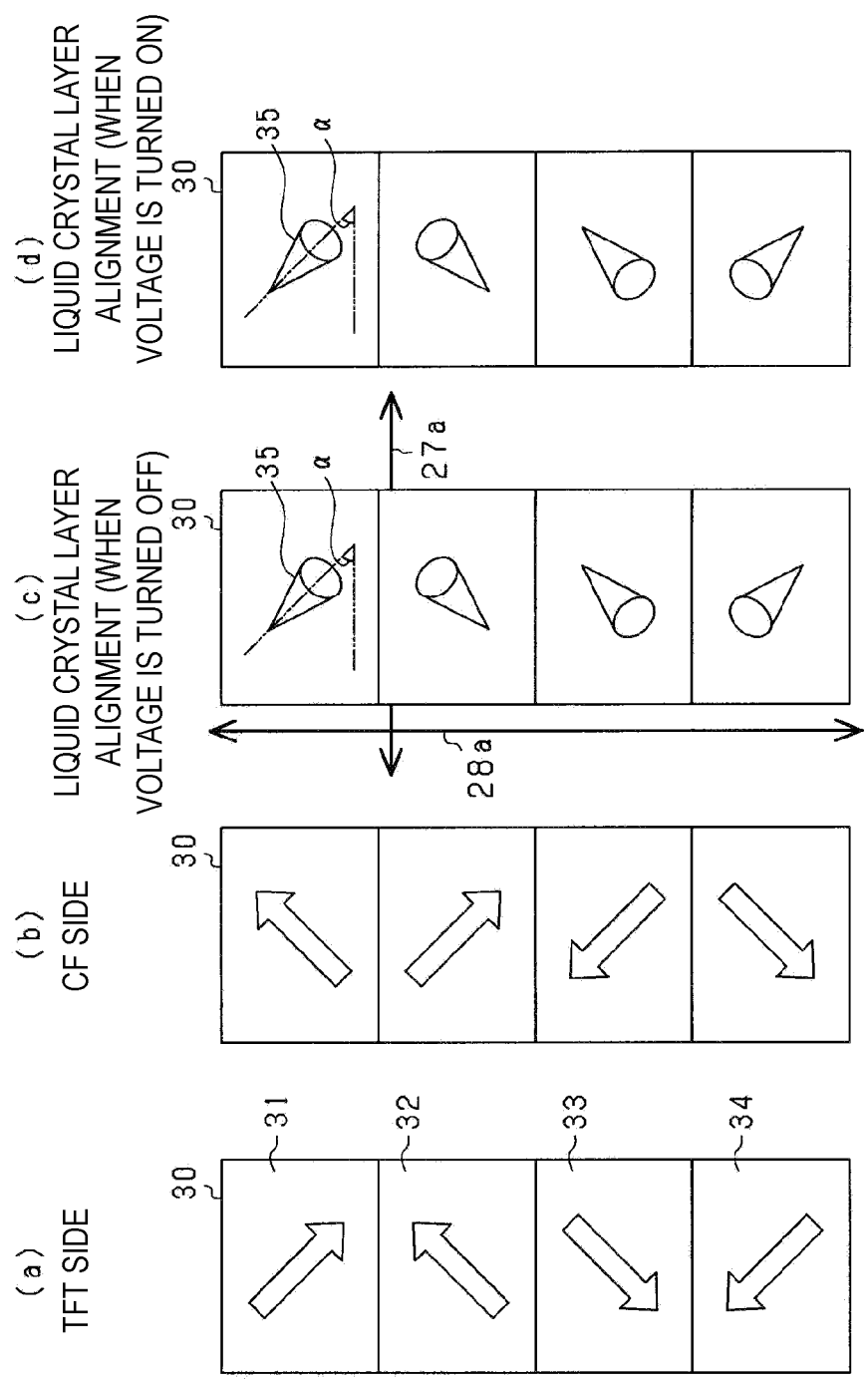
FIG. 21 shows schematic views of tilt orientations and alignment orientations of pixels of liquid crystal display devices of Comparative Example 4 and Comparative Example 5.

An optical vertical type liquid crystal display device was produced in the same manner as in Example 1 except that a solid electrode on which no slit was provided was used as the TFT substrate and the CF substrate and divided exposure was performed on the coating film on the side of the TFT substrate and the side of the CF substrate so that the tilt orientation was the orientation indicated by the white arrow shown in (a) and (b) of FIG. 21 (FIG. 21). The pretilt angle of the obtained liquid crystal display device was 89.0 degrees on both the side of the TFT substrate and the side of the CF substrate. The liquid crystal projection angle α was 45 degrees. Here, (a) to (c) of FIG. 21 are the same as those of FIG. 3, and (d) shows the alignment orientation of the liquid crystal layer 13 when the voltage was turned on.

2. Evaluation of Transmittance Characteristics

In the same manner as in Example 1, the transmittance of the liquid crystal display device produced in the above 1. was calculated by simulation. In this example, the maximum transmittance at the polar angle θ=0 degrees and the azimuth angle φ=0 degrees was 0.272 and the transmittance characteristics were determined as "poor." In addition, the transmittance ratio $α(V_{100})$ at the voltage $V_{100}$ was 1.12, and the transmittance ratio $α(V_{20})$ at the voltage $V_{20}$ was 0.69, and the viewing angle characteristics were determined as "poor."

Comparative Example 5

1. Production of Liquid Crystal Display Device

An optical vertical type liquid crystal display device was produced in the same manner as in Example 1 except that a solid electrode on which no slit was provided was used as the TFT substrate and the CF substrate, the liquid crystal alignment agent (AL-3) was used in place of the liquid crystal alignment agent (AL-1), and divided exposure was performed on the coating film on the side of the TFT substrate and the side of the CF substrate so that the tilt orientation was the orientation indicated by the white arrow in (a) and (b) of FIG. 21 (FIG. 21). The pretilt angle of the obtained liquid crystal display device was 87.0 degrees on both the side of the TFT substrate and the side of the CF substrate. The liquid crystal projection angle α was 45 degrees.

2. Evaluation of Transmittance Characteristics

In the same manner as in Example 1, the transmittance of the liquid crystal display device produced in the above 1. was measured. In this example, the maximum transmittance at the polar angle θ=0 degrees and the azimuth angle φ=0 degrees was 0.298, and the transmittance characteristics were determined as "good." On the other hand, the transmittance ratio $α(V_{100})$ at the voltage $V_{100}$ was 1.11, the transmittance ratio $α(V_{20})$ at the voltage $V_{20}$ was 0.65, and the viewing angle characteristics were determined as "poor."

Comparative Example 6

1. Production of Liquid Crystal Display Device

Figure 22:
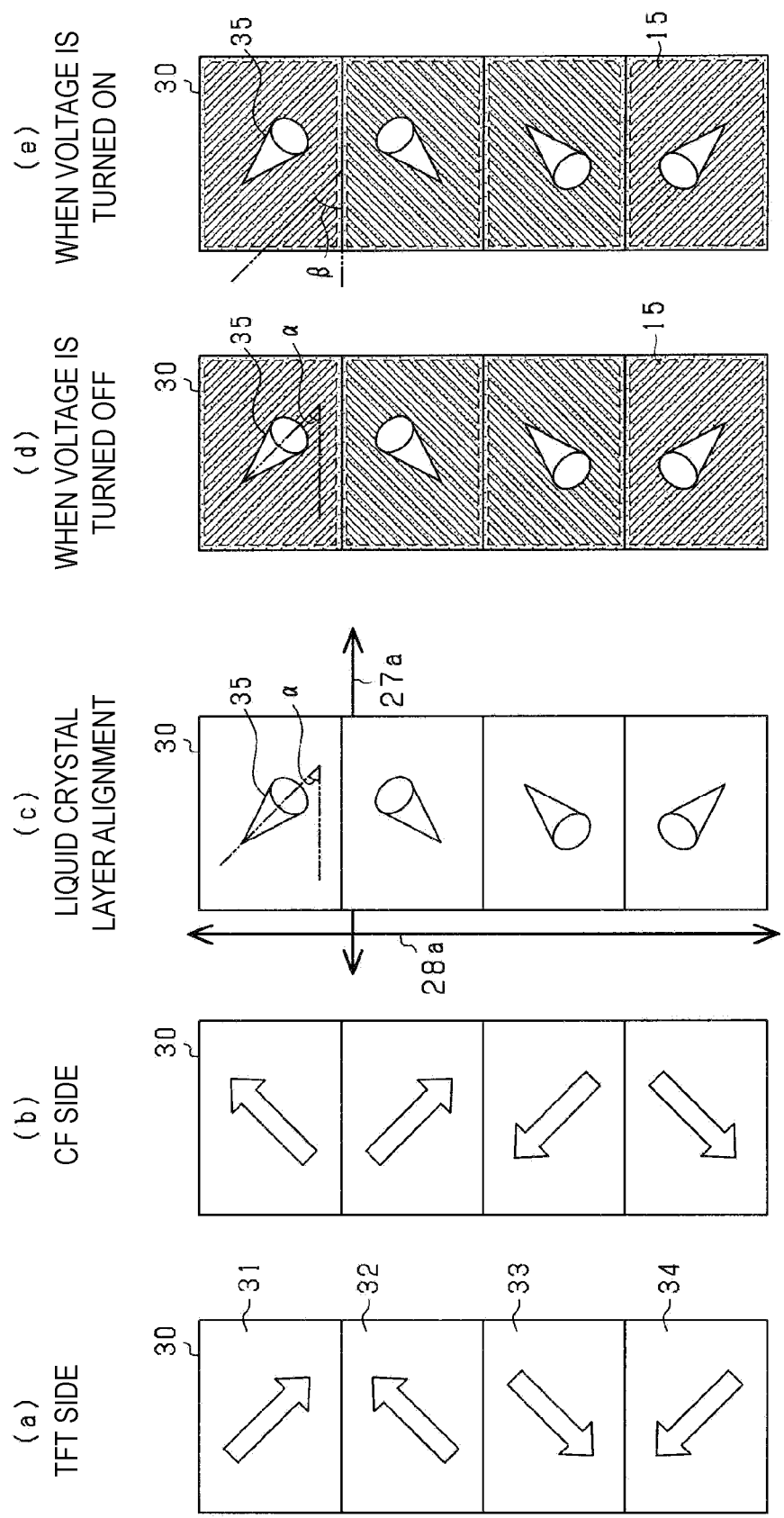
FIG. 22 shows schematic views of tilt orientations and alignment orientations of pixels of a liquid crystal display device of Comparative Example 6.

An optical vertical type liquid crystal display device was produced in the same manner as in Example 1 except that exposure was performed on the coating film formed on the TFT substrate and the CF substrate so that the tilt orientation was the orientation indicated by the white arrow in (a) and (b) of FIG. 22 (FIG. 22). The pretilt angle of the obtained liquid crystal display device was 89.0 degrees on both the side of the TFT substrate and the side of the CF substrate. The liquid crystal projection angle α was 45 degrees.

2. Evaluation of Transmittance Characteristics

In the same manner as in Example 1, the transmittance of the liquid crystal display device produced in the above 1. was calculated by simulation. In this example, the maximum transmittance at the polar angle θ=0 degrees and the azimuth angle φ=0 degrees was 0.306, and the transmittance characteristics were determined as "good." On the other hand, the transmittance ratio $α(V_{100})$ at the voltage $V_{100}$ was 1.12, the transmittance ratio $α(V_{20})$ at the voltage $V_{20}$ was 0.69, the viewing angle characteristics were determined as "poor."

The liquid crystal alignment agents used in Comparative Examples 1 to 6, and the liquid crystal projection angle α, the slit angle θ, the angle γ formed by the alignment orientation of the liquid crystal layer when the voltage was turned off and the slit direction, and the transmittance ratio α(V) of the liquid crystal display devices are summarized in the following Table 2.

TABLE 2

| | Alignment agent | Liquid crystal projection angle α | Slit angle β | Angle γ | Maximum transmittance | $\alpha(V_{100})$ | $\alpha(V_{20})$ |
|---|---|---|---|---|---|---|---|
| Comparative Example 1 | AL-1 | 45° | — | — | 0.243 | 1.12 | 0.74 |
| Comparative Example 2 | AL-5 | 45° | — | — | 0.288 | 1.12 | 0.65 |
| Comparative Example 3 | AL-1 | 45° | 45° | 0° | 0.306 | 1.12 | 0.69 |
| Comparative Example 4 | AL-1 | 45° | — | — | 0.272 | 1.12 | 0.69 |
| Comparative Example 5 | AL-3 | 45° | — | — | 0.298 | 1.11 | 0.65 |
| Comparative Example 6 | AL-1 | 45° | 45° | 0° | 0.306 | 1.12 | 0.69 |

Example 11

Figure 23:
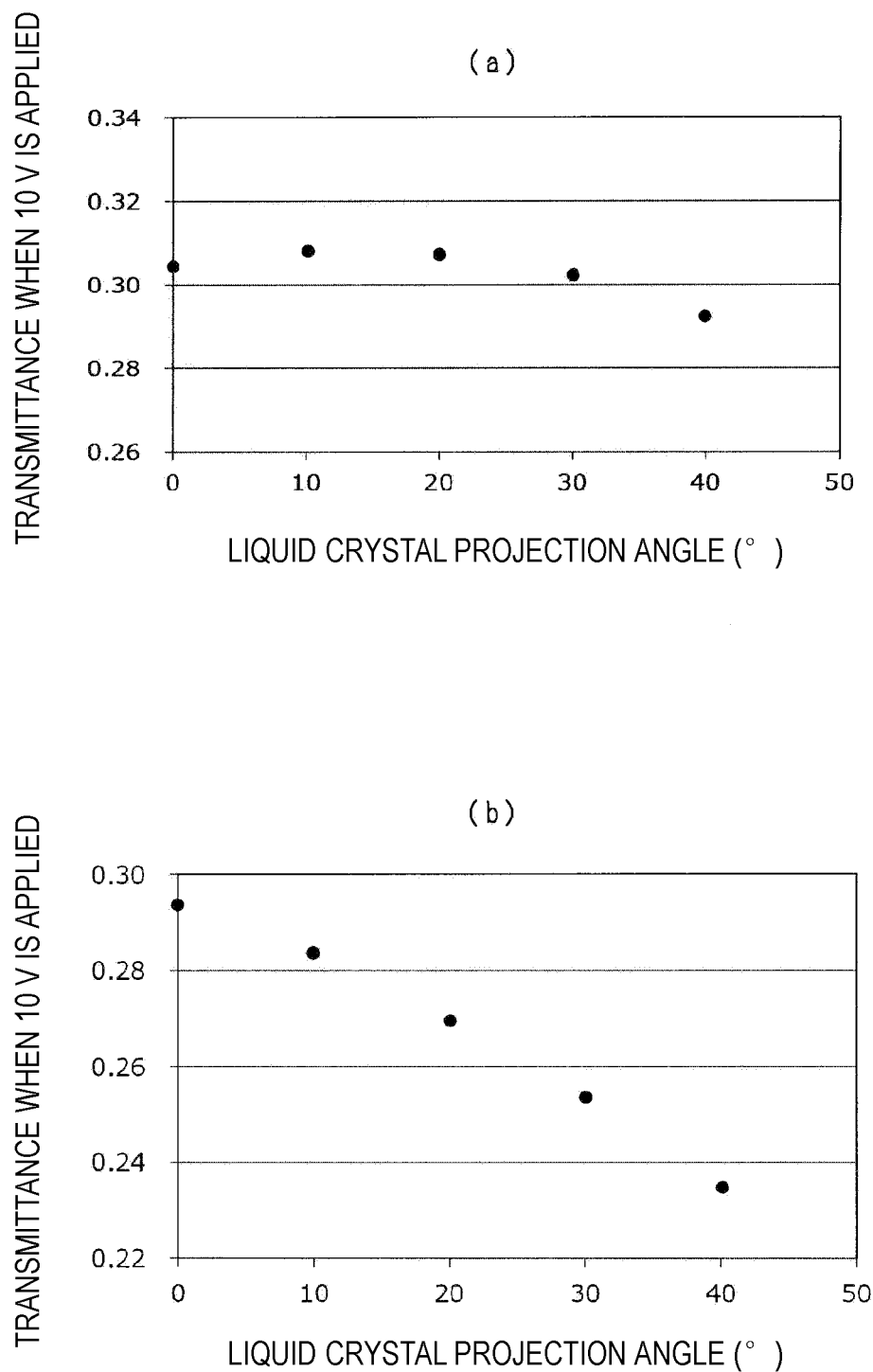
FIG. 23 shows diagrams of liquid crystal projection angle-transmittance characteristics.

The slit angle β was set as a fixed value, the liquid crystal projection angle α was changed to 0 degrees, 10 degrees, 20 degrees, 30 degrees and 40 degrees, and thus the change in transmittance with respect to the change in the liquid crystal projection angle α was examined. The transmittance was measured using Expert LCD (commercially available from LinkGlobal21), and computation was performed under conditions of the liquid crystal alignment agent (AL-1), the applied voltage=10 V, the polar angle θ=0 degrees, and the azimuth angle φ=0 degrees. The results are shown in FIG. 23. Here, in FIG. 23, (a) shows the results obtained when the slit angle was 60 degrees, and (b) shows the results obtained when the slit angle θ was 75 degrees.

As shown in FIG. 23, when β=60 degrees, the transmittance when 10 V was applied was larger than 0.30 when the liquid crystal projection angle α was 30 degrees or less, and on the other hand, the decrease in transmittance was large when the liquid crystal projection angle α was 40 degrees. Particularly, when the liquid crystal projection angle α was 0 degrees or more and 20 degrees or less, the transmittance was stable with almost no change, and the transmittance characteristics were excellent. In addition, from the results when β=75 degrees, it can be said that the liquid crystal projection angle α was preferably 30 degrees or less.

Example 12

Figure 24:
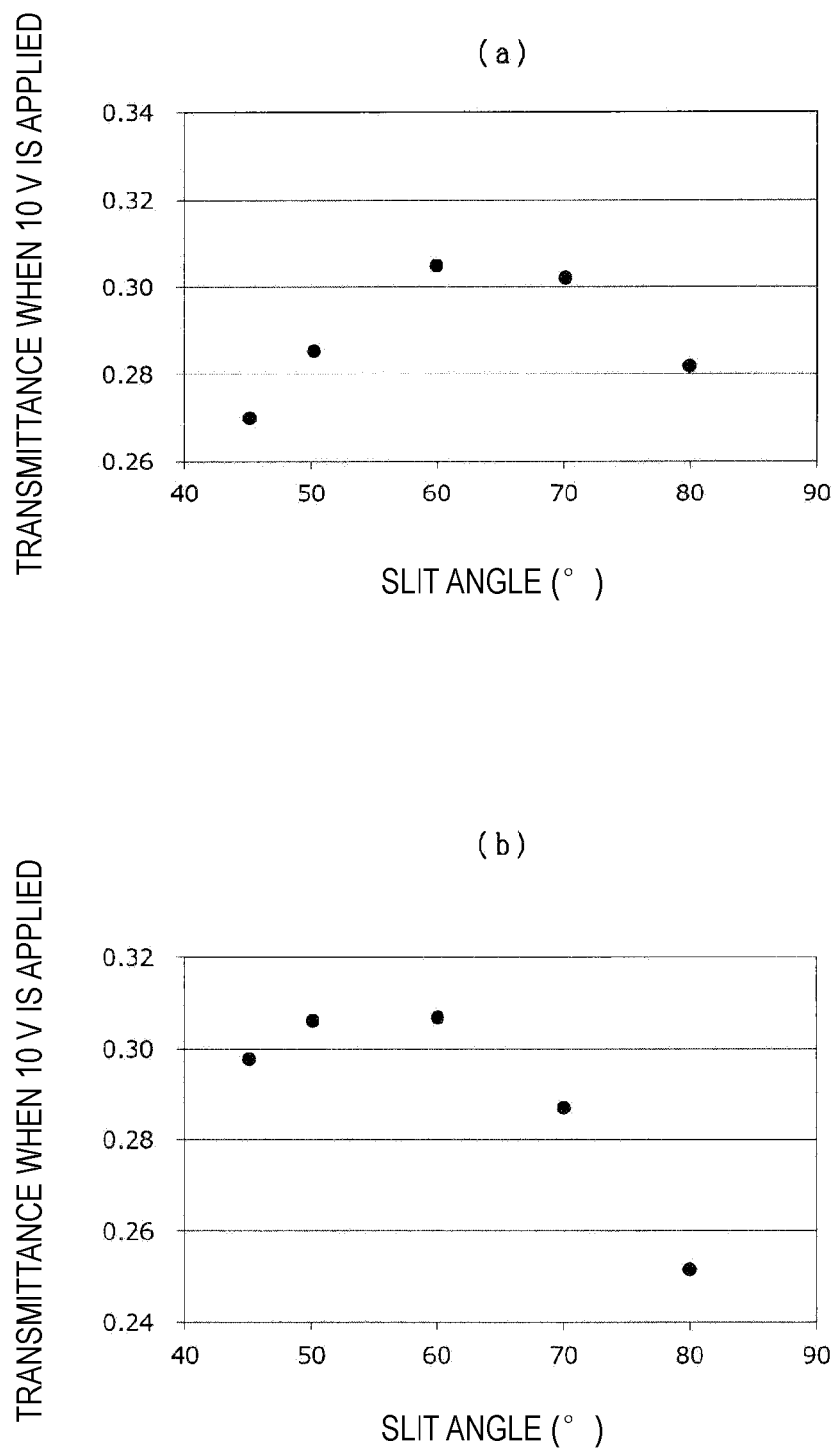
FIG. 24 shows diagrams of slit angle-transmittance characteristics.

Next, the liquid crystal projection angle α was set as a fixed value, the slit angle β was changed to 45 degrees, 50 degrees, 60 degrees, 70 degrees and 80 degrees, and thus the change in transmittance with respect to the change in the slit angle β was examined. Computation of the transmittance was the same as in Example 11. The results are shown in FIG. 24. Here, in FIG. 24, (a) shows the results obtained when the liquid crystal projection angle α was 0 degrees, and (b) shows the results obtained when the liquid crystal projection angle α was 20 degrees.

As shown in FIG. 24, when the liquid crystal projection angle α=0 degrees, and the slit angle β was 50 degrees, 60 degrees, and 70 degrees, the transmittance was higher and better than when the slit angle β was 45 degrees and 80 degrees. From the results when α=20 degrees, it can be said that the slit angle θ was preferably larger than 45 degrees and less than 80 degrees.

Examples 13 to 24

For the liquid crystal display device of Example 1, conditions of the electrode width (L) and the slit width (S) of the pixel electrode, and the cell gap (d) were changed as shown in the following Table 3, and the influence on the transmittance of the liquid crystal display device was examined. The transmittance was calculated by simulation using Expert LCD (commercially available from LinkGlobal21) in the same manner as in Example 1. When the maximum transmittance at the polar angle θ=0 degrees and the azimuth angle φ=0 degrees was 0.310 or more, the transmittance characteristics were evaluated as "excellent (⊚)," and when the maximum transmittance was 0.280 or more and less than 0.310, the transmittance characteristics were evaluated as "good (○)." The evaluation results are shown below. Here, in Table 3, in the columns "L<1.1d" and "S<d", "○" is displayed when the corresponding conditions were satisfied and "x" is displayed when the corresponding conditions were not satisfied.

TABLE 3

| | Alignment agent | Liquid crystal projection angle α | Slit angle β | Angle γ | TFT side L/S (μm/μm) | d (μm) | d × 1.1 μm | L < 1.1d | S < d | Maximum transmittance Value | Evaluation | $\alpha(V_{100})$ | $\alpha(V_{20})$ |
|---|---|---|---|---|---|---|---|---|---|---|---|---|---|
| Example 1 | AL-1 | 10° | 45° | 35° | 3.5/2.5 | 3.4 | 3.74 | ○ | ○ | 0.314 | ⊚ | 1.08 | 1.01 |
| Example 13 | AL-1 | 10° | 45° | 35° | 4.0/4.0 | 3.4 | 3.74 | X | X | 0.302 | ○ | 1.09 | 0.95 |
| Example 14 | AL-1 | 10° | 45° | 35° | 3.0/3.0 | 3.4 | 3.74 | ○ | ○ | 0.314 | ⊚ | 1.08 | 1.00 |
| Example 15 | AL-1 | 10° | 45° | 35° | 2.5/2.5 | 3.4 | 3.74 | ○ | ○ | 0.317 | ○ | 1.08 | 1.02 |
| Example 16 | AL-1 | 10° | 45° | 35° | 3.0/3.0 | 3.2 | 3.52 | ○ | ○ | 0.314 | ○ | 1.08 | 1.00 |
| Example 17 | AL-1 | 10° | 45° | 35° | 2.5/2.5 | 3.2 | 3.52 | ○ | ○ | 0.315 | ⊚ | 1.08 | 1.00 |
| Example 18 | AL-1 | 10° | 45° | 35° | 3.5/2.5 | 3.2 | 3.52 | ○ | ○ | 0.312 | ⊚ | 1.08 | 1.00 |
| Example 19 | AL-1 | 10° | 45° | 35° | 2.5/3.5 | 3.2 | 3.52 | ○ | X | 0.308 | ○ | 1.08 | 0.97 |

TABLE 3-continued

| | Alignment agent | Liquid crystal projection angle α | Slit angle β | TFT side Angle γ | L/S (μm/μm) | d (μm) | d × 1.1 (μm) | L < 1.1d | S < d | Maximum transmittance Value | Evaluation | α(V$_{100}$) | α(V$_{20}$) |
|---|---|---|---|---|---|---|---|---|---|---|---|---|---|
| Example 20 | AL-1 | 10° | 45° | 35° | 3.5/1.5 | 3.2 | 3.52 | ○ | ○ | 0.311 | ◎ | 1.07 | 1.01 |
| Example 21 | AL-1 | 10° | 45° | 35° | 2.5/2.5 | 2.9 | 3.19 | ○ | ○ | 0.310 | ◎ | 1.07 | 0.97 |
| Example 22 | AL-1 | 10° | 45° | 35° | 3.5/2.5 | 2.9 | 3.19 | X | ○ | 0.300 | ○ | 1.07 | 0.97 |
| Example 23 | AL-1 | 10° | 45° | 35° | 2.5/3.5 | 2.9 | 3.19 | ○ | X | 0.290 | ○ | 1.07 | 0.92 |
| Example 24 | AL-1 | 10° | 45° | 35° | 3.0/3.0 | 2.9 | 3.19 | ○ | X | 0.296 | ○ | 1.07 | 0.95 |

As shown in Table 3, in all of Examples 1 and 13 to 24, the maximum transmittance was 0.280 or more, and the transmittance characteristics were good. Particularly, when the electrode width was smaller than 1.1 times the cell gap (L<1.1d), and the slit width was smaller than the cell gap (S<d) (Examples 1, 14 to 18, 20, and 21), the maximum transmittance had a value of 0.310 or more, which was particularly excellent.

The invention claimed is:

1. A liquid crystal display device in which a plurality of pixels are arranged in a display region, comprising:
   a first substrate, on which a pixel electrode having a slit is provided;
   a second substrate, arranged to face the first substrate;
   a liquid crystal layer, disposed between the first substrate and the second substrate and contains liquid crystal molecules having negative dielectric anisotropy;
   a first alignment film, formed on the first substrate; and
   a second alignment film, formed on the second substrate,
   wherein at least one of the first alignment film and the second alignment film is a photo-alignment film,
   wherein each pixel in the plurality of pixels has a plurality of alignment regions in which alignment orientations of liquid crystal molecules are different from each other when a voltage is applied,
   wherein the slit is arranged in each alignment region in the plurality of alignment regions and has an oblique slit part formed to extend in an oblique direction with respect to each side of the pixel, and
   wherein an angle formed by a direction in which the oblique slit part extends and a liquid crystal projection direction is 20 degrees or more and 85 degrees or less, wherein the liquid crystal projection direction is a direction in which a longitudinal direction of liquid crystal molecules present in the vicinity of the center of the liquid crystal layer in a thickness direction when no voltage is applied is projected onto the first substrate.

2. The liquid crystal display device according to claim 1, wherein an angle formed by a predetermined side among the sides and the liquid crystal projection direction is 0 degrees or more and 30 degrees or less.

3. The liquid crystal display device according to claim 2, wherein an angle formed by the predetermined side and a direction in which the oblique slit part extends is 45 degrees or more and 85 degrees or less.

4. The liquid crystal display device according to claim 1, comprising:
   a first polarizing plate, disposed on an opposite side to the liquid crystal layer with the first substrate therebetween; and
   a second polarizing plate, disposed on an opposite side to the liquid crystal layer with the second substrate therebetween,
   wherein, in a plan view, a transmission axis of the first polarizing plate and a transmission axis of the second polarizing plate are orthogonal to each other, and
   wherein, when an axial direction of the transmission axis of the first polarizing plate is defined as 0 degrees and an axial direction of the transmission axis of the second polarizing plate is defined as 90 degrees, the liquid crystal projection direction is 0 degrees or more and 30 degrees or less in each of the plurality of alignment regions, and the direction in which the oblique slit part extends is 45 degrees or more and 85 degrees or less in each of the plurality of alignment regions.

5. The liquid crystal display device according to claim 4, wherein, when the axial direction of the transmission axis of the first polarizing plate is defined as 0 degrees and the axial direction of the transmission axis of the second polarizing plate is defined as 90 degrees, the liquid crystal projection direction is 0 degrees or more and 20 degrees or less.

6. The liquid crystal display device according to claim 4, wherein, when the axial direction of the transmission axis of the first polarizing plate is defined as 0 degrees and the axial direction of the transmission axis of the second polarizing plate is defined as 90 degrees, the direction in which the oblique slit part extends is 50 degrees or more and 75 degrees or less.

7. The liquid crystal display device according to claim 1, wherein, in each alignment region of the plurality of alignment regions, among a pretilt angle defined by the first alignment film and a pretilt angle defined by the second alignment film, one is less than 90 degrees and the other is substantially 90 degrees.

8. The liquid crystal display device according to claim 1, wherein, among the plurality of alignment regions, in some alignment regions, a pretilt angle defined by the first alignment film is less than 90 degrees, and a pretilt angle defined by the second alignment film is substantially 90 degrees, and in the remaining alignment regions, a pretilt angle defined by the first alignment film is substantially 90 degrees and a pretilt angle defined by the second alignment film is less than 90 degrees.

9. The liquid crystal display device according to claim 1, wherein the photo-alignment film is formed using at least one selected from the group consisting of polymers obtained by using polyamic acid, polyamic acid ester, polyimide, polyorganosiloxane and monomers having unsaturated bonds.

10. The liquid crystal display device according to claim 1, wherein the plurality of alignment regions are arranged side by side along a side extending in a predetermined direction among the sides.

11. The liquid crystal display device according to claim 1, wherein the plurality of alignment regions are arranged side by side along a side extending in a first direction and a side extending in a second direction orthogonal to the first direction among the sides.

12. The liquid crystal display device according to claim 1, wherein, when an electrode width of the pixel electrode is L, a width of the slit is S, and a thickness of the liquid crystal layer is d, L<1.1d and S<d are satisfied.

13. A liquid crystal display device in which a plurality of pixels are arranged in a display region, comprising:
- a first substrate, on which a pixel electrode having a slit is provided;
- a second substrate, arranged to face the first substrate;
- a liquid crystal layer, disposed between the first substrate and the second substrate and contains liquid crystal molecules having negative dielectric anisotropy;
- a first alignment film, formed on the first substrate;
- a second alignment film, formed on the second substrate;
- a first polarizing plate, disposed on an opposite side to the liquid crystal layer with the first substrate therebetween; and
- a second polarizing plate, disposed on an opposite side to the liquid crystal layer with the second substrate therebetween, wherein at least one of the first alignment film and the second alignment film is a photo-alignment film, wherein each pixel in the plurality of pixels has a plurality of alignment regions in which alignment orientations of liquid crystal molecules are different from each other when a voltage is applied, wherein the slit is arranged in each alignment region in the plurality of alignment regions and has an oblique slit part formed to extend in an oblique direction with respect to each side of the pixel, and wherein, in a plan view, a transmission axis of the first polarizing plate and a transmission axis of the second polarizing plate are orthogonal to each other, and wherein, when an axial direction of the transmission axis of the first polarizing plate is defined as 0 degrees and an axial direction of the transmission axis of the second polarizing plate is defined as 90 degrees, a liquid crystal projection direction is 0 degrees or more and 30 degrees or less in each of the plurality of alignment regions, wherein the liquid crystal projection direction is a direction in which a longitudinal direction of liquid crystal molecules present in the vicinity of the center of the liquid crystal layer in a thickness direction when no voltage is applied is projected onto the first substrate, and an angle formed by a direction in which the oblique slit part extends and the axial direction of the transmission axis of the first polarizing plate is 45 degrees or more and 85 degrees or less in each of the plurality of alignment regions.

* * * * *